United States Patent

Franaszek

[15] 3,689,899

[45] Sept. 5, 1972

[54] RUN-LENGTH-LIMITED VARIABLE-LENGTH CODING WITH ERROR PROPAGATION LIMITATION

[72] Inventor: Peter A. Franaszek, Mount Kisco, N.Y.

[73] Assignee: International Business Machines Corporation, Armonk, N.Y.

[22] Filed: June 7, 1971

[21] Appl. No.: 150,317

[52] U.S. Cl. ..........................340/172.5, 340/146.1 D

[51] Int. Cl. ..........................G08c 25/00, G06f 11/00

[58] Field of Search .............340/172.5, 146.1 D, 347

[56] References Cited

UNITED STATES PATENTS

| | | | |
|---|---|---|---|
| 3,626,167 | 12/1971 | Guck et al. | 340/347 X |
| 3,576,947 | 5/1971 | Kruger | 340/146.1 X |
| 3,457,562 | 7/1969 | Fano | 340/347 DD |
| 3,456,234 | 7/1969 | Glasson | 340/146.1 |
| 3,444,522 | 5/1969 | Polhemus | 340/172.5 |
| 3,336,467 | 8/1967 | Frey | 340/146.1 X |
| 3,208,049 | 9/1965 | Doty et al. | 340/172.5 |
| 3,016,527 | 1/1962 | Gilbert et al | 340/347 |
| 3,051,940 | 8/1962 | Fleckenstein | 340/347 |

*Primary Examiner*—Paul J. Henon
*Assistant Examiner*—Ronald F. Chapuran
*Attorney*—Hanifin and Jancin and C. P. Boberg

[57] ABSTRACT

This is a run-length-limited, variable-length coding scheme which reduces the implementation needed to perform encoding and decoding functions and which limits the propagation of framing errors caused by incorrect coding or faulty bit detection. All code words utilized in this scheme are constrained to have distinctive word-ending bit sequences. Word-ending tests are performed repeatedly at strategic points in the bit stream in order to detect bit patterns that may denote word endings, and framing decisions are based upon these tests. Decoding functions are suspended while each new code word or frame is being serially entered into the input register for decoding. Where misframing occurs due to the presence of an erroneous bit in a code word, the propagation of such a framing error through subsequent words is limited by the fact that subsequent word-ending tests are performed independently of the framing decisions that preceded them, and also due to the fact that the average code word length is much less than in a fixed-length code system. Synchronism is quickly restored upon detecting a valid word-ending bit pattern following the erroneous bit. While the code words are of variable length, the rate of data transmission is constant due to a fixed ratio between the number of original data bits and the corresponding encoded data bits.

22 Claims, 14 Drawing Figures

LEGEND

W = MAXIMUM ENCODED WORD LENGTH
$\frac{N}{\alpha}$ = RATIO OF ENCODED BITS/ORIGINAL BITS, WHERE N AND $\alpha$ ARE LEAST INTEGERS.
L = LENGTH OF ORIGINAL BIT STRING (VARIABLE)

INVENTOR
PETER A. FRANASZEK
BY Charles P. Boberg
ATTORNEY

ENCODING PROCEDURE

DECODING PROCEDURE

ENCODING CLOCK

DECODING CLOCK

FIG. 6

CODE CONVERSION TABLE FOR (1,8) CODE

| ENCODED WORDS | ORIGINAL OR DECODED WORDS | L |
|---|---|---|
| 0 1 0 X X X X X X | 0 0 X X X X | 0 1 0 |
| 1 0 0 X X X X X X | 1 1 X X X X | 0 1 0 |
| 1 0 1 0 0 0 X X X | 1 0 0 0 X X | 1 0 0 |
| 1 0 1 0 1 0 X X X | 1 0 0 1 X X | 1 0 0 |
| 0 0 1 0 1 0 X X X | 1 0 1 0 X X | 1 0 0 |
| 0 0 1 0 0 0 X X X | 1 0 1 1 X X | 1 0 0 |
| 0 0 0 1 0 0 X X X | 0 1 0 0 X X | 1 0 0 |
| 0 0 0 0 1 0 X X X | 0 1 1 0 X X | 1 0 0 |
| 0 0 0 0 0 1 0 1 0 | 0 1 1 1 0 0 | 1 1 0 |
| 0 0 0 0 0 1 0 0 0 | 0 1 1 1 0 1 | 1 1 0 |
| 0 0 0 1 0 1 0 1 0 | 0 1 1 1 1 0 | 1 1 0 |
| 0 0 0 1 0 1 0 0 0 | 0 1 1 1 1 1 | 1 1 0 |
| 0 0 1 0 0 1 0 1 0 | 0 1 0 1 0 0 | 1 1 0 |
| 0 0 1 0 0 1 0 0 0 | 0 1 0 1 0 1 | 1 1 0 |
| 1 0 1 0 0 1 0 1 0 | 0 1 0 1 1 0 | 1 1 0 |
| 1 0 1 0 0 1 0 0 0 | 0 1 0 1 1 1 | 1 1 0 |
| | 0 0 0 0 0 0 | DUMMY WORD (READ OUT IF NO MATCH FOUND DURING DECODING) |
| 9 BITS | 6 BITS | 3 BITS |
| 22 | 24 | 26 |

X = DONT CARE

W = 9
N = 3
$\alpha$ = 2

20

CODE CONVERSION TABLE FOR (2,7) CODE

FIG. 7

| ENCODED WORDS | ORIGINAL OR DECODED WORDS | L |
|---|---|---|
| 0 1 0 0 X X X X | 1 1 X X | 0 1 0 |
| 1 0 0 0 X X X X | 1 0 X X | 0 1 0 |
| 0 0 0 1 0 0 X X | 0 1 1 X | 0 1 1 |
| 0 0 1 0 0 0 X X | 0 1 0 X | 0 1 1 |
| 1 0 0 1 0 0 X X | 0 0 0 X | 0 1 1 |
| 0 0 1 0 0 1 0 0 | 0 0 1 1 | 1 0 0 |
| 0 0 0 0 1 0 0 0 | 0 0 1 0 | 1 0 0 |
| | 0 0 0 0 | DUMMY WORD (READ OUT IF NO MATCH FOUND DURING DECODING) |
| 8 BITS | 4 BITS | 3 BITS |
| 22 | 24 | 26 |

X = DONT CARE

W = 8
N = 2
$\alpha$ = 1

20

FRAMING DECISION TABLE FOR (1,8) CODE

| A | B | FRAME LENGTH | LENGTH COUNTER SETTING | |
|---|---|---|---|---|
| | | | DECIMAL | BINARY |
| 0 | 0 | 9 | 6 | 1 1 0 |
| 0 | 1 | 6 | 4 | 1 0 0 |
| 1 | 0 | 3 | 2 | 0 1 0 |
| 1 | 1 | 3 | 2 | 0 1 0 |

FRAMING DECISION TABLE FOR (2, 7) CODE

| A | B | C | FRAME LENGTH | LENGTH COUNTER SETTING | |
|---|---|---|---|---|---|
| | | | | DECIMAL | BINARY |
| 0 | 0 | 0 | 8 | 4 | 1 0 0 |
| 0 | 0 | 1 | 6 | 3 | 0 1 1 |
| 0 | 1 | 0 | 4 | 2 | 0 1 0 |
| 1 | 0 | 0 | 2 | 1 | 0 0 1 |
| 1 | 0 | 1 | 6 | 3 | 0 1 1 |

FIG. 10

EXAMPLE 1: (1,8) CODE

CORRECT SEQUENCE: 1 0 1 0 1 0 0 1 0 1 0 0 0 0 1 0 0 0 ····
CORRECT FRAMING:

ERROR ERRORS

DETECTED SEQUENCE: 1 0 0 0 1 0 0 1 1 0 0 0 0 0 1 0 0 0 ····
ACTUAL FRAMING:

| SELECTED FRAME LENGTH | BIT POSITION NUMBERS | | | | | | | | | | SHIFT INTERVAL |
|---|---|---|---|---|---|---|---|---|---|---|---|
| | 10 | 9 | 8 | 7 | 6 | 5 | 4 | 3 | 2 | 1 | |
| 9 BITS | 0 | 0 | 0 | 0 | 0 | 0 | 0 | 0 | 0 | 0 | T0 |
| INITIAL INGATING OPERATION (DECODING SUSPENDED) | 0 | 0 | 0 | 0 | 0 | 0 | 0 | 0 | 0 | 1 | T1 |
| | 0 | 0 | 0 | 0 | 0 | 0 | 0 | 0 | 1 | 0 | T2 |
| | 0 | 0 | 0 | 0 | 0 | 0 | 0 | 1 | 0 | 0 | T3 |
| | 0 | 0 | 0 | 0 | 0 | 0 | 1 | 0 | 0 | 0 | T4 |
| | 0 | 0 | 0 | 0 | 0 | 1 | 0 | 0 | 0 | 1 | T5 |
| | 0 | 0 | 0 | 0 | 1 | 0 | 0 | 0 | 1 | 0 | T6 |
| | 0 | 0 | 0 | 1 | 0 | 0 | 0 | 1 | 0 | 0 | T7 |
| | 0 | 0 | 1 | 0 | 0 | 0 | 1 | 0 | 0 | 1 | T8 |
| 3 BITS | 0 | 1 | 0 | 0 | 0 | 1 | 0 | 0 | 1 | 1 | T9 |
| (DECODING SUSPENDED) | 1 | 0 | 0 | 0 | 1 | 0 | 0 | 1 | 1 | 0 | T10 |
| | 0 | 0 | 0 | 1 | 0 | 0 | 1 | 1 | 0 | 0 | T11 |
| 3 BITS | 0 | 0 | 1 | 0 | 0 | 1 | 1 | 0 | 0 | 0 | T12 |
| (DECODING SUSPENDED) | 0 | 1 | 0 | 0 | 1 | 1 | 0 | 0 | 0 | 0 | T13 |
| | 1 | 0 | 0 | 1 | 1 | 0 | 0 | 0 | 0 | 0 | T14 |
| 6 BITS | 0 | 0 | 1 | 1 | 0 | 0 | 0 | 0 | 0 | 1 | T15 |
| (DECODING SUSPENDED) | 0 | 1 | 1 | 0 | 0 | 0 | 0 | 0 | 1 | 0 | T16 |
| | 1 | 1 | 0 | 0 | 0 | 0 | 0 | 1 | 0 | 0 | T17 |
| | 1 | 0 | 0 | 0 | 0 | 0 | 1 | 0 | 0 | 0 | T18 |
| | 0 | 0 | 0 | 0 | 0 | 1 | 0 | 0 | 0 | | T19 |
| | 0 | 0 | 0 | 0 | 1 | 0 | 0 | 0 | | | T20 |
| 6 BITS | 0 | 0 | 0 | 1 | 0 | 0 | 0 | | | | T21 |

FRAMING REFERENCE POINT

FIG. 11

EXAMPLE 2: (2, 7) CODE

CORRECT SEQUENCE: 1 0 0 0 1 0 0 1 0 0 0 0 0 0 1 0 0 0 1 0 0 ....
CORRECT FRAMING:

ERROR ERROR

DETECTED SEQUENCE: 1 0 0 1 1 0 0 1 0 0 0 1 0 0 0 1 0 0 0 1 0 0 ....
ACTUAL FRAMING:

| SELECTED FRAME LENGTH | BIT POSITION NUMBERS 10 | 9 | 8 | 7 | 6 | 5 | 4 | 3 | 2 | 1 | SHIFT INTERVAL |
|---|---|---|---|---|---|---|---|---|---|---|---|
| 8 BITS | 0 | 0 | 0 | 0 | 0 | 0 | 0 | 0 | 0 | 0 | T0 |
| INITIAL INGATING OPERATION (DECODING SUSPENDED) | 0 | 0 | 0 | 0 | 0 | 0 | 0 | 0 | 0 | 1 | T1 |
| | 0 | 0 | 0 | 0 | 0 | 0 | 0 | 0 | 1 | 0 | T2 |
| | 0 | 0 | 0 | 0 | 0 | 0 | 0 | 1 | 0 | 0 | T3 |
| | 0 | 0 | 0 | 0 | 0 | 0 | 1 | 0 | 0 | 1 | T4 |
| | 0 | 0 | 0 | 0 | 0 | 1 | 0 | 0 | 1 | 1 | T5 |
| | 0 | 0 | 0 | 0 | 1 | 0 | 0 | 1 | 1 | 0 | T6 |
| | 0 | 0 | 0 | 1 | 0 | 0 | 1 | 1 | 0 | 0 | T7 |
| 8 BITS | 0 | 0 | 1 | 0 | 0 | 1 | 1 | 0 | 0 | 1 | T8 |
| DECODING SUSPENDED | 0 | 1 | 0 | 0 | 1 | 1 | 0 | 0 | 1 | 0 | T9 |
| | 1 | 0 | 0 | 1 | 1 | 0 | 0 | 1 | 0 | 0 | T10 |
| | 0 | 0 | 1 | 1 | 0 | 0 | 1 | 0 | 0 | 0 | T11 |
| | 0 | 1 | 1 | 0 | 0 | 1 | 0 | 0 | 0 | 1 | T12 |
| | 1 | 1 | 0 | 0 | 1 | 0 | 0 | 0 | 1 | 0 | T13 |
| | 1 | 0 | 0 | 1 | 0 | 0 | 0 | 1 | 0 | 0 | T14 |
| | 0 | 0 | 1 | 0 | 0 | 0 | 1 | 0 | 0 | 0 | T15 |
| 6 BITS | 0 | 1 | 0 | 0 | 0 | 1 | 0 | 0 | 0 | 1 | T16 |
| DECODING SUSPENDED | 1 | 0 | 0 | 0 | 1 | 0 | 0 | 0 | 1 | 0 | T17 |
| | 0 | 0 | 0 | 1 | 0 | 0 | 0 | 1 | 0 | 0 | T18 |
| | 0 | 0 | 1 | 0 | 0 | 0 | 1 | 0 | 0 | 0 | T19 |
| | 0 | 1 | 0 | 0 | 0 | 1 | 0 | 0 | 0 | 1 | T20 |
| | 1 | 0 | 0 | 0 | 1 | 0 | 0 | 0 | 1 | 0 | T21 |
| 4 BITS | 0 | 0 | 0 | 1 | 0 | 0 | 0 | 1 | 0 | 0 | T22 |
| DECODING SUSPENDED | 0 | 0 | 1 | 0 | 0 | 0 | 1 | 0 | 0 | | T23 |
| | 0 | 1 | 0 | 0 | 0 | 1 | 0 | 0 | | | T24 |
| | 1 | 0 | 0 | 0 | 1 | 0 | 0 | | | | T25 |
| 4 BITS | 0 | 0 | 0 | 1 | 0 | 0 | | | | | T26 |

FRAMING REFERENCE POINT

STATE-DEPENDENT ENCODING-DECODING OPERATIONS

RUN-LENGTH-LIMITED VARIABLE-LENGTH CODING WITH ERROR PROPAGATION LIMITATION

BACKGROUND OF THE INVENTION

Various ways have been proposed for increasing the density with which data can be recorded on disks or similar media in data utilization systems or the rate at which it can be reliably transmitted through existing channels. One such technique is run-length-limited coding, which requires that each 1 in a coded bit sequence must be separated from the nearest adjacent 1 by a number of 0's at least equal to a minimum quantity $d$ in order to insure freedom from inter-symbol interference during recording or transmission but not exceeding a maximum number $k$ which is required for self-clocking purposes. Such codes also may be referred to as "$dk$-limited" codes. The present invention is directed particularly to data processing systems which utilize this type of coding.

Prior run-length-limited coding systems have been designed on the assumption that the information which is being recorded or transmitted will be handled in processable units or "words" of fixed length. Coding efficiency requires that these fixed-length words be of substantial length, such as a standard 8-bit "byte", for example, shorter words being much less efficient. On the other hand, the complexity of the encoding and decoding apparatus increases at a very great rate ( i.e., exponentially) as the word length increases. As one aspect of the present invention, it has been found that the desired coding efficiency can be achieved without unduly complicating the design of the encoding and decoding apparatus if the encoded information is handled in the form of variable-length words rather than fixed-length words. The maximum word length required for achieving a given degree of data density in a variable-length system is considerably less than the word length needed in a fixed-length system having the same data density, and the encoding-decoding equipment in the variable-length system does not even approach in complexity that which is needed in a fixed-length system.

The use of variable-length coding may present other problems, however. There being no fixed "frame length" or code word length in such a system, special measures must be taken to insure that the encoded bit stream is subdivided or "framed" at the proper places to demarcate the respective code words therein. One prior system which has been proposed for this purpose requires the use of special marker bits, one of which is inserted as a prefix ahead of each variable-length code word that is to be decoded in order to mark with certainty the beginning of that word. This code word, with its prefix bit, then is entered bit-by-bit as an argument into a shift register, and as each new bit enters the register, a test is made to see whether the bit pattern that has been built up behind the marker bit can be recognized as a complete code word by a table lookup procedure. This means, in effect, that a decoding operation must be attempted upon each new fragment of the argument as it is being incrementally built up in the argument register, until a match is found. A decoding process of this kind is relatively slow.

A further disadvantage of variable-length coding, as currently practiced, is its susceptibility to framing problems which result whenever the bit pattern of a code word is incorrectly represented, due to faulty bit detection, for example. To meet this problem, it has been customary to rely upon the statistical probability that a true word-ending will be found by chance as the decoding progresses, without an unduly extended propagation of the framing error through the succeeding portions of the bit stream. Variable-length coding schemes which have been designed to limit error propagation upon a statistical probability basis have been found unsatisfactory for a number of reasons. First, they do not work well in practice, since many, if not most, data bases will not lend themselves to the statistical approach to error propagation limitation. Under some conditions, synchronism may never be regained without stopping and restarting the system. Secondly, such codes do not have the run-length-limited constraints which have been found to be highly desirable for achieving efficient data transmission and recording operations. For these reasons, and others, the statistical approach to error propagation limitation is not generally regarded with favor.

SUMMARY OF THE INVENTION

An object of the present invention is to provide a novel data encoding and decoding process that will take advantage of the savings in processing time and cost of equipment which can be realized by the combined use of run-length-limited coding and variable-length coding. It is a further object to accomplish this without incurring the disadvantage of slow or unreliable performance and without sacrificing the constant data transmission rate which characterizes fixed-length coding systems.

To explain how the present system achieves a high rate of data handling without a sacrifice of reliability, it may be observed first that decoding of variable-length code words can be speeded up if the framing test has to be performed only once per code word, instead of being performed repeatedly upon each code word or argument as it is being built up by increments prior to decoding. This mode of operation requires that the frame length be determined only at the time when the complete code word is available and at about the same time that the actual decoding of that word takes place. The frame length determines the number of shift operations which the input register must perform in order to bring the bits of the next succeeding code word into proper position for decoding. The correct code word length can be derived from the decoded information itself only if the code word used as an argument was free of error. If any of the bits in that word had been erroneously encoded or erroneously detected prior to decoding, no reliable indication of the code word length can be derived from the decoded information. Consequently, the system would be likely to make an incorrect framing decision if it relied upon such information, and once a framing error of this kind is made, it will tend to be propagated in an unpredictable fashion through succeeding code words or frames. Such an out-of-frame condition ordinarily would require stopping and restarting the transmission, thereby wasting time.

A feature of the present invention is that it enables a system of the kind just described to function in a reliable manner despite even very serious errors in the code representations of the data words. Any framing error which is caused by a faulty code bit representation will have only a limited effect upon subsequent framing decisions made by the system. Instead of being propagated for an indefinite interval and in an unpredictable fashion through the succeeding parts of the bit stream, the out-of-frame condition will be propagated through only a very limited portion of the stream, usually through one or two words only. Moreover, since the average code word length is relatively small, word-endings occur with relative frequency, and this, too, tends to limit the effect of error propagation.

As one aspect of the invention, there is proposed herein a new class of run-length-limited, variable-length codes having a constant ratio of encoded bits to decoded bits and having novel constraints which cause each code word to terminate in a selected one of several predefined word-ending bit sequences, no other word-terminating sequences being permitted. In one such coding system, for example, each code word is at least four bits long and must end in a string of not less than two and not more than three consecutively positioned 0's. As each successive portion of the detected bit stream is presented for decoding, certain word-ending tests are made at strategically located points within the series of bits presented. When a pattern of bits identical with one of the permissible word-terminating sequences is found, a satisfaction signal is generated for that group of bit positions. Several such tests may be performed simultaneously upon different parts of the bit series in an effort to locate any sequence of bits whose pattern of 1's and 0's may indicate a word-ending point. Depending upon the outputs of these tests, the system decides where to divide the bit series for decoding purposes and how many bits are to be brought in for the next word-termination or framing test. Each framing test is made concurrently with a word-decoding operation, as a phase of that operation, so that it adds nothing to the time otherwise required for decoding. Once a framing decision is made, all framing and decoding functions then are suspended until the number of succeeding bits indicated by the framing decision has entered the decoding argument register and has been properly positioned therein for decoding. No intermediate framing tests need be made, thus saving considerable time.

This framing technique simultaneously checks the bit stream at many different points, not just at one place, and it forces the system back into synchronism whenever the conditions of any framing test are satisfied. It has the further advantage that all of the information needed for making correct framing decisions is contained within the code words themselves, as they come from the encoded data base. No marker bits or other extraneous information need be added. When performing each word-termination test, the system in a sense forgets what it did previously and treats each new series of bits as though they occupy the leading positions of a new bit stream. It is possible, of course, for the system to receive a false indication of a word ending if a set of bits not at the end of a word but resembling a permissible word-terminating set happens to occupy the positions at which the word-ending test is then being performed. Moreover, if none of the word-ending tests is satisfied, the system has to make some arbitrary decoding decision in order not to delay its processing of the succeeding data. Any out-of-frame condition which may develop as the result of these decisions, however, will be corrected when the next word-ending test is satisfied, and no further propagation of the framing error can take place. This limits the effect of misframing to a tolerable amount.

The word-ending tests described above are useful not only to limit the propagation of any misframing caused by coding errors but also to determine the coding "-state". Some codes of the class herein contemplated are "state-dependent", which is to say that the coding of any particular word depends upon the terminal state of the immediately preceding code word, this being done in order to avoid violating the desired run-length-limiting constraints when the code words are concatenated. The number of 0's which intervene between the last 1 in the preceding code word and the first 1 in the current code word must be in the range of values from $d$ to $k$, inclusive. Some of the codes described herein are state-independent, meaning that every word may be encoded from the same encoding table without reference to any other code word, and all such code words may be freely concatenated in any desired fashion without violating the established $(d,k)$ constraints. Other codes of this class, which are state-dependent, require that each word be encoded from a selected one of several encoding tables according to the terminal state of the preceding code word. This restriction also may apply in some instances to the decoding process as well. The type of word-ending test which is proposed herein to limit framing error propagation may serve also to identify the current coding state for selectively decoding and/or encoding each word in accordance with the previous word ending.

The foregoing and other objects features and advantages of the invention will be apparent from the following more particular description of a preferred embodiment of the invention, as illustrated in the accompanying drawings.

DESCRIPTION OF DRAWINGS

FIGS. 6 and 7, respectively, are representations of code conversion tables utilized by a system of the kind shown in FIGS. 1A and 1B for the performance of encoding and decoding operations in $dk$-limited, variable-length coding systems wherein the ( $d,k$) constraints are ( 1,8) and ( 2,7), respectively.

FIGS. 10 and 11 are tabular diagrams showing the framing operations that are performed by the present system upon specimen code trains in the ( 1,8) and ( 2,7) coding systems, respectively.

DETAILED DESCRIPTION OF PREFERRED EMBODIMENT

Figure 1A:
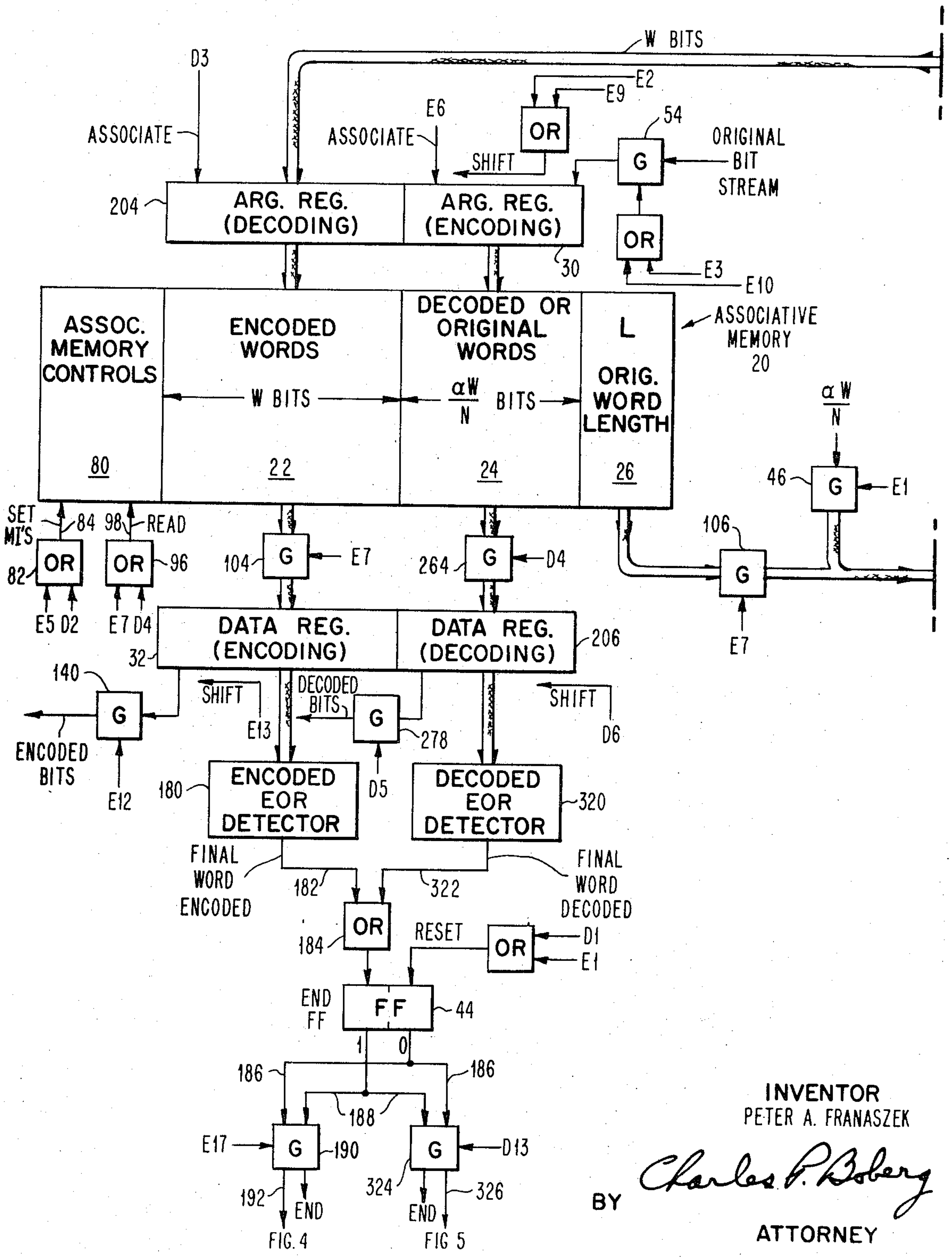
FIGS. 1A and 1B constitute a general circuit diagram of an illustrative encoding-decoding system embodying the principle of the invention, this particular arrangement being suited for the processing of state-independent codes.
Figure 1B:
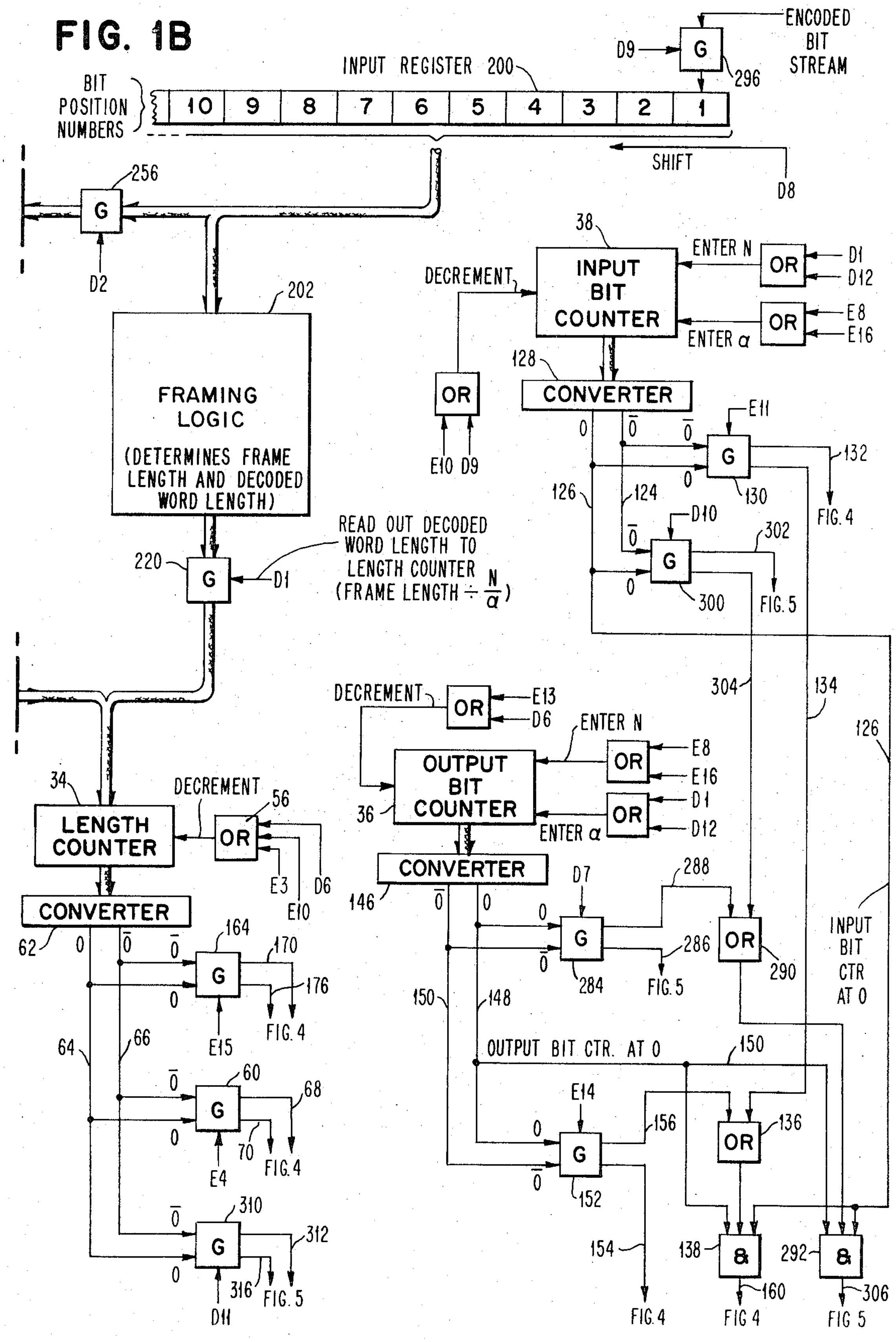
Figure 4:
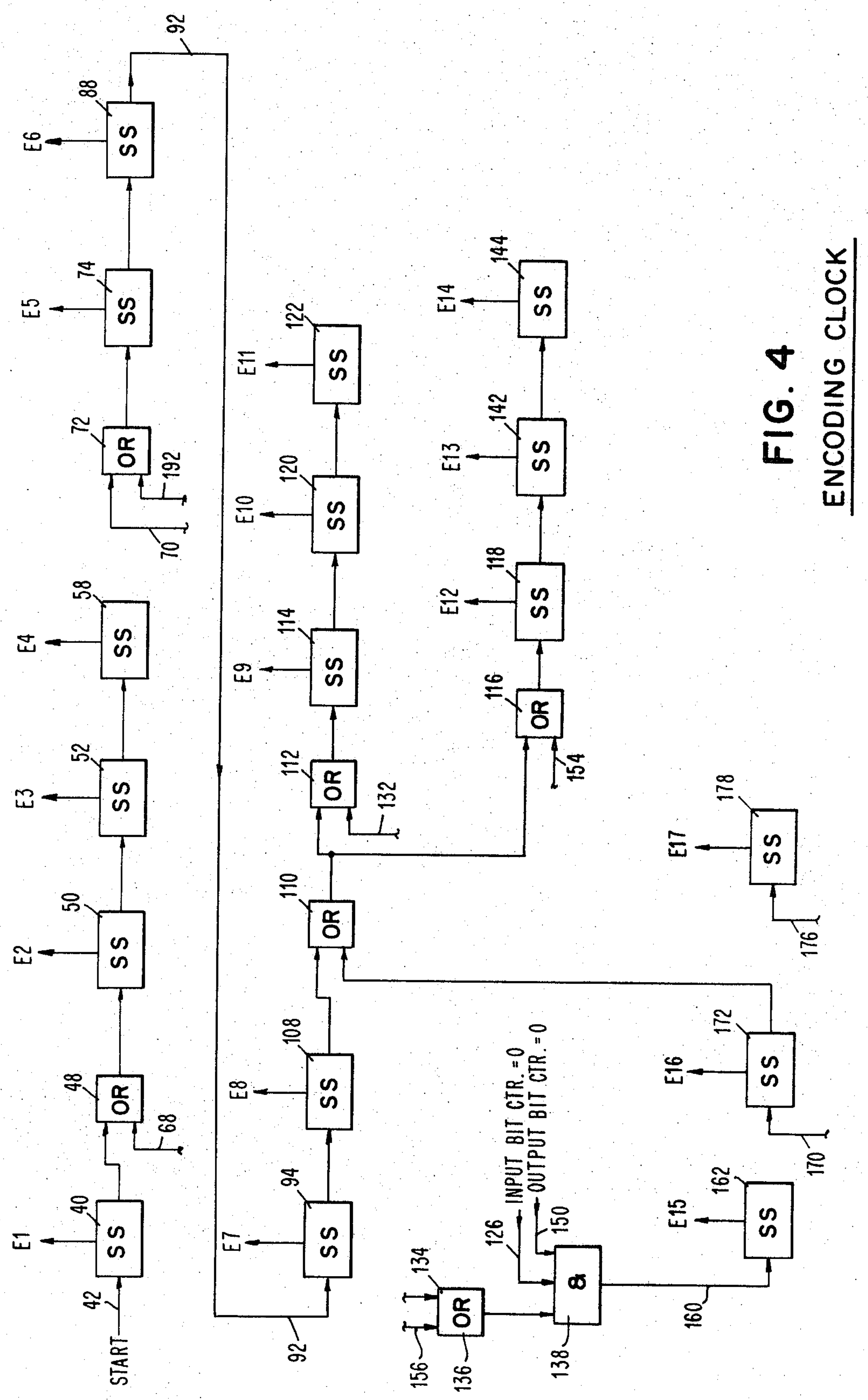
FIG. 4 is a circuit diagram of an encoding clock or pulse generator which furnishes timing pulses for the encoding functions performed by the system of FIGS. 1A and 1B.
Figure 5:
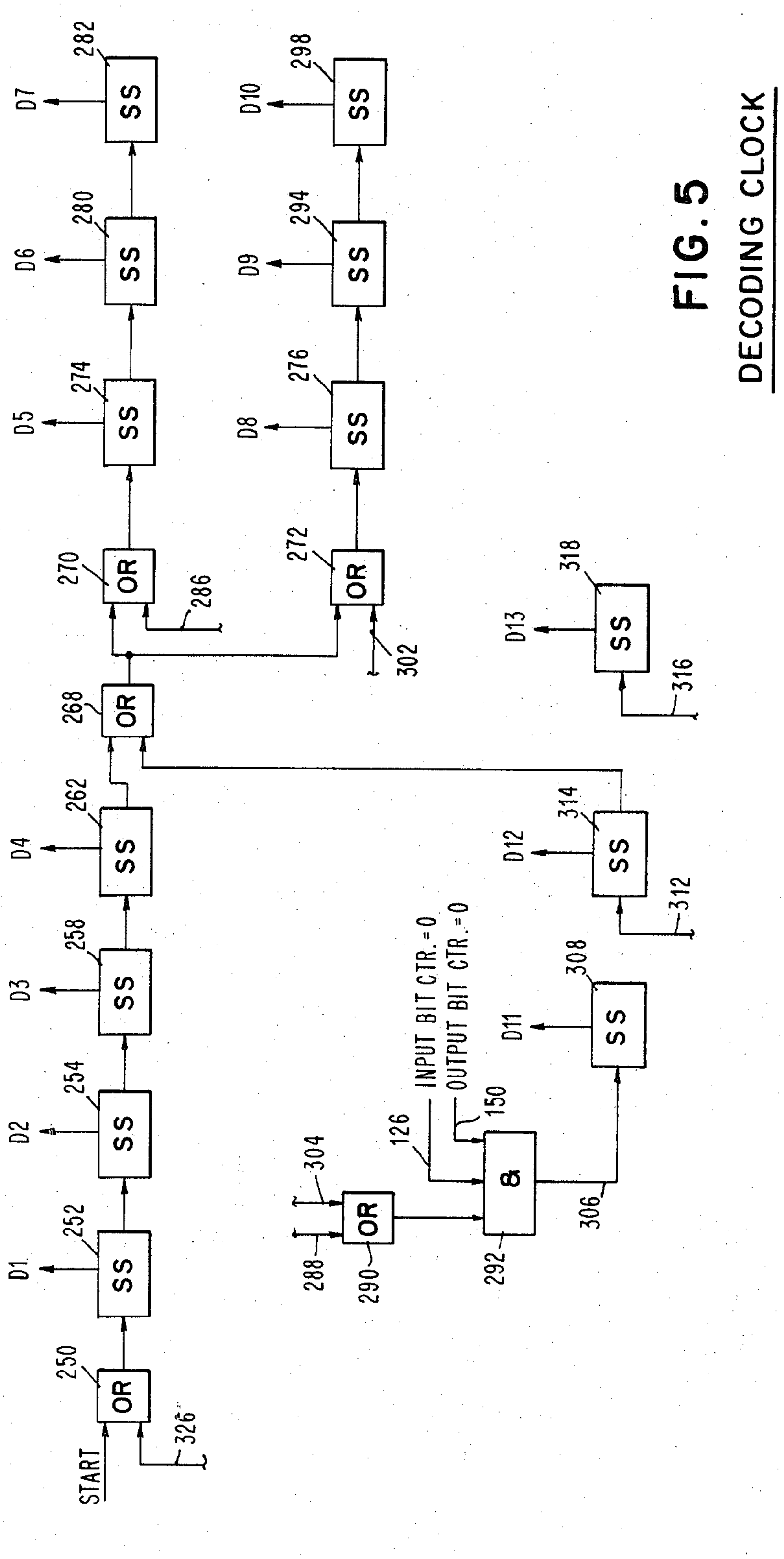
FIG. 5 is a circuit diagram of a decoding clock or pulse generator which furnishes timing pulses for the decoding functions performed by the system of FIGS. 1A and 1B.

FIGS. 1A and 1B, in conjunction with the clock circuitry shown in FIGS. 4 and 5, illustrate the essential parts of an apparatus which is designed to perform encoding and decoding functions in accordance with the invention. Exemplary codes which may be processed by a system of this kind are represented in the code conversion tables of FIGS. 6 and 7. All such codes have the following characteristics in common:

a. They are run-length-limited codes in which the succeeding 1's of each encoded bit sequence are separated by no fewer than $d$ and no more than $k$ 0's, the choice of $d$ and $k$ depending upon the specific code that is being used.

b. The coded information is processed in code groups or code words of variable length, and the lengths of the encoded words have a constant ratio to the respective lengths of their corresponding original ( or decoded) bit strings, thereby insuring a constant data transmission or data recording rate.

c. Each encoded word (if it has been properly encoded and detected) will terminate in one of several distinctive bit sequences which can readily be recognized as a word ending in order to establish a framing point in the encoded bit stream.

The present description is concerned more with the practical implementation of procedures whereby information is encoded and decoded according to the above principles than it is with theoretical factors underlying the formation of the code conversion tables themselves. However, some of the considerations which underlie the design of code conversion tables for use in the present type of system will be explained herein. For a more complete treatment of the mathematical theory, reference may be had to the article entitled "Sequence-state Methods for Run-length-limited Coding", by P. A. Franaszek, in the July 1970 issue of the IBM Journal of Research and Development, pages 376–383.

Before commencing the detailed description of the illustrated system, an explanation will be given of the term "code word" or "code group" as used herein. A "word" is considered to be any individually processable sequence of bits, i.e., a string of bits, of whatever length, that can be handled as a unit by the system. For the purpose of this invention, the manner in which a stream of bits is subdivided or "framed" into its constituent words or bit strings is determined entirely by convenience of processing and has no necessary relationship to the intelligence that is being conveyed by the bit stream. That is to say, no attempt is made herein to frame the bit stream so that the code group within each frame will define an individual character or other readily identifiable unit of numerical or textual information.

The code conversion tables shown in FIGS. 6 and 7 illustrate the nature of the coding scheme which is utilized herein. The table shown in FIG. 6 is designed for a run-length-limited code in which $d$=1 and $k$=8. That shown in FIG. 7 is designed for a code whose run-length constraints are $d$=2 and $k$=7. Considering the table of FIG. 6, as an example, it is seen that according to the (1,8) code, each time a bit sequence 00 is encountered at the point which marks the beginning of a word in the original bit stream, the 00 bit string is encoded into the word 010. As another example, if the bit sequence 1000 is encountered immediately following a word beginning point, it will be encoded into the word 101000. In each instance it will be noted that there are three encoded bits for two original bits, this 3/2 ratio being constant for the (1,8) code. Similarly, in the case of the (2,7) code, the ratio between the numbers of encoded bits and original bits is 2/1. In general, for any given code system which is constructed on the principles of this invention, the ratio of encoded bits to original bits remains constant at $N/\alpha$, where N and $\alpha$ are the least integers expressing that ratio. ( These two symbols have the same meaning herein that they do in the inventor's published article, cited above.)

One significant fact that may be noted with regard to code conversion tables that are constructed according to this invention is their very small size. Thus, in the case of the ( 1,8) code, FIG. 6, the entire code dictionary includes only 16 code words, whose lengths vary from 3 to 9 bits, in multiples of 3. In the case of the ( 2,7) code, FIG. 7, the code dictionary includes only 7 code words with lengths varying from 2 bits to 8 bits, in multiples of 2. If information were to be encoded with an equivalent bit-per-symbol value in a run-length-limited coding system having fixed word lengths, the size of the code dictionary would increase enormously ( in orders of magnitude) due to the relative inflexibility of coding in a fixed-length, run-length limited system. This would greatly increase the complexity of the apparatus needed for table lookup operations or equivalent encoding and decoding functions. As mentioned in the above-cited article ( page 380), a ( 4,9) code has a code dictionary of 512 words in a fixed-length format but only six words in a variable-length format.

The code tables are represented in FIGS. 6 and 7 in the form that they would have if stored in the associative memory 20, FIG. 1A, which contains three-state memory cells in its sections 22 and 24 wherein the encoded words and original words, respectively, are stored. The symbol "X" in FIG. 6 and FIG. 7 represents a three-state memory cell in its third or "don't care" state, to which it is set when it is not storing any of the significant bits of a word. Each storage cell in the memory sections 22 and 24 is settable to one of the following three states, as desired:

1. A binary 1 state, in which the cell will respond with a mismatch signal if interrogated by a 0 bit but will generate no output if interrogated by a 1 bit.

2. A binary 0 state, in which the cell will respond with a mismatch signal if interrogated by a 1 bit but will generate no output if interrogated by a 0 bit.

3. A "don't care" state (indicated by "X", FIGS. 6 and 7) in which the cell is incapable of generating a mismatch signal regardless of whether it is interrogated by a 1 or 0 bit. In this state the cell is effectively masked from interrogation.

The specific construction of the associative memory 20 with its three-state cells is not disclosed in detail herein. Such memories are well known. Reference may be had, for example, to U.S. Pat. No. 3,543,296 issued on Nov. 24, 1970 to P. A. E. Gardner et al. (IBM Docket No. UK9-67-021) for a showing of a three-state cell that can be used in the present associative memory. An associative memory using another form of three-state cell for decoding purposes is shown in the copending application of Josef Raviv and Michael A. Wesley, Ser. No. 62,306, filed Aug. 10, 1970 (IBM Docket No. YO9-70-040). The advantage of a three-state cell is that it can be individually masked from interrogation without requiring that all other cells in the same column be masked.

The third section 26 of associative memory 20, FIG. 1A, stores length indicia L, which are used during the encoding process to denote the number of significant bits in the original word that is being encoded. As an example, referring to FIG. 6, the original word 00 is associated with a binary length designation (L) of 010, or 2 in decimal notation, which indicates that there are two bits in this original word. Since the ratio ($N/\alpha$) of encoded bits to original bits in this particular code system is 3/2, the length of the corresponding code word (010) is 3 bits. The length indicia L are used only during encoding operations. During decoding operations the necessary word length information is derived as an incident to the framing function.

ENCODING

The encoding procedure will be described with particular reference to FIGS. 1A, 1B, 2, 4, 6 and 7. As explained hereinabove, it is assumed for present purposes that the system will process information according to a state-independent coding scheme, such as the (1,8) code or the (2,7) code chosen for illustration herein (FIGS. 6 and 7). This means that a single encoding-decoding table may be used, and the code words generated by this table may be freely concatenated without violating the specified $(d,k)$ constraints.

If one should choose to use a state-dependent coding scheme, the encoding procedure will be similar except that it will involve a choice among several code tables according to the terminal state of the word that previously was encoded. The required modifications of the illustrated system for enabling it to perform state-dependent coding will be briefly explained hereinafter.

The encoding procedure is conducted in the following general manner: The bits of information to be encoded are entered serially into an argument register 30, FIG. 1A. Initially a number of bits equal to $\alpha W/N$ will be entered into the register 30, this number corresponding to the maximum length of the words stored in memory section 24. The association is performed on this argument, and the matching code word is read out from memory section 22 and entered into a data register 32. At the same time, the related length indication L is read out of memory section 26 and is entered into a length counter 34, FIG. 1B. Thus, the length of the original matching word now is registered in the length counter 34.

There follows a period during which the code word stored in the data register 32 is serially read out therefrom. Concurrently with this action, new bits from the original bit stream are serially entered into the argument register 30, the contents of which are progressively shifted leftward in order to accommodate the newly entered bits. It is necessary that the number of bits read out of the data register 32 be equal to the length of the code word and that the number of new bits entered into argument register 30 equal the number of bits in the original word that has just been encoded. This word will be progressively shifted out of the argument register while the new entry is being made. The length counter 34, which has been set according to the L value as described above, will control both of these actions so that the proper number of bits is read out or entered, respectively. The setting of the length counter 34 is decremented by 1 each time a new bit is entered into the argument register 30, and when the length counter setting has been reduced to 0, the entry of new bits into the register 30 ceases until the next encoding operation takes place.

The data register 32 has a capacity sufficient to accommodate a code word having the maximum length W. If the code word which was read out during the association performed by memory 20 has a length less than W, only the appropriate number of bits will be read out of register 32 into the encoded bit stream. In any event, the ratio between the number of bits read out of register 32 and the number of bits entered into the register 30 must be kept constant at the value $N/\alpha$. Stating this another way, for every $\alpha$ bits fed into the argument register 30, N bits must be read out of the data register 32. This ratio is maintained by intermittently setting two bit counters 36 and 38, FIG. 1B, to the appropriate values. Counter 36, herein designated the "output bit counter", is set initially to the value N during the encoding operation and is decremented by 1 each time a bit is outgated from data register 32. Counter 38, herein designated the "input bit counter", initially is set to the value $\alpha$ during encoding operations and is decremented by 1 each time a bit enters the argument register 30.

The functions of reading out encoded bits and entering new original bits are performed in such a manner that they are approximately contemporaneous with each other. To explain this further, when any group of $\alpha$ bits has entered register 30, thereby reducing the setting of input bit counter 38 to 0, the entry of the next succeeding group of $\alpha$ bits into the register 30 will be deferred until the current group of N encoded bits has been read out of the data register 32. Then, when the setting of the output bit counter 36 reduces to 0, the two bit counters 36 and 38 are again set to N and $\alpha$, respectively, to control the ingating of $\alpha$ bits into the register 30 and the outgating of N bits from the register 32, until the current code word has been completely read out of register 32. This fact is indicated when the setting of length counter 34 reduces to 0.

While new bits are being entered into the argument register 30, the contents of this register are correspondingly being shifted to the left. The length counter setting determines the number of leftward shifts that will be performed according to the length of the bit group or bit string that was just encoded. Consequently, as the last bit of the old group is shifted out of the argument register 30, the leading bit of the new group becomes positioned at the proper place for a new association to be performed thereon by the associative memory 20.

Figure 2:
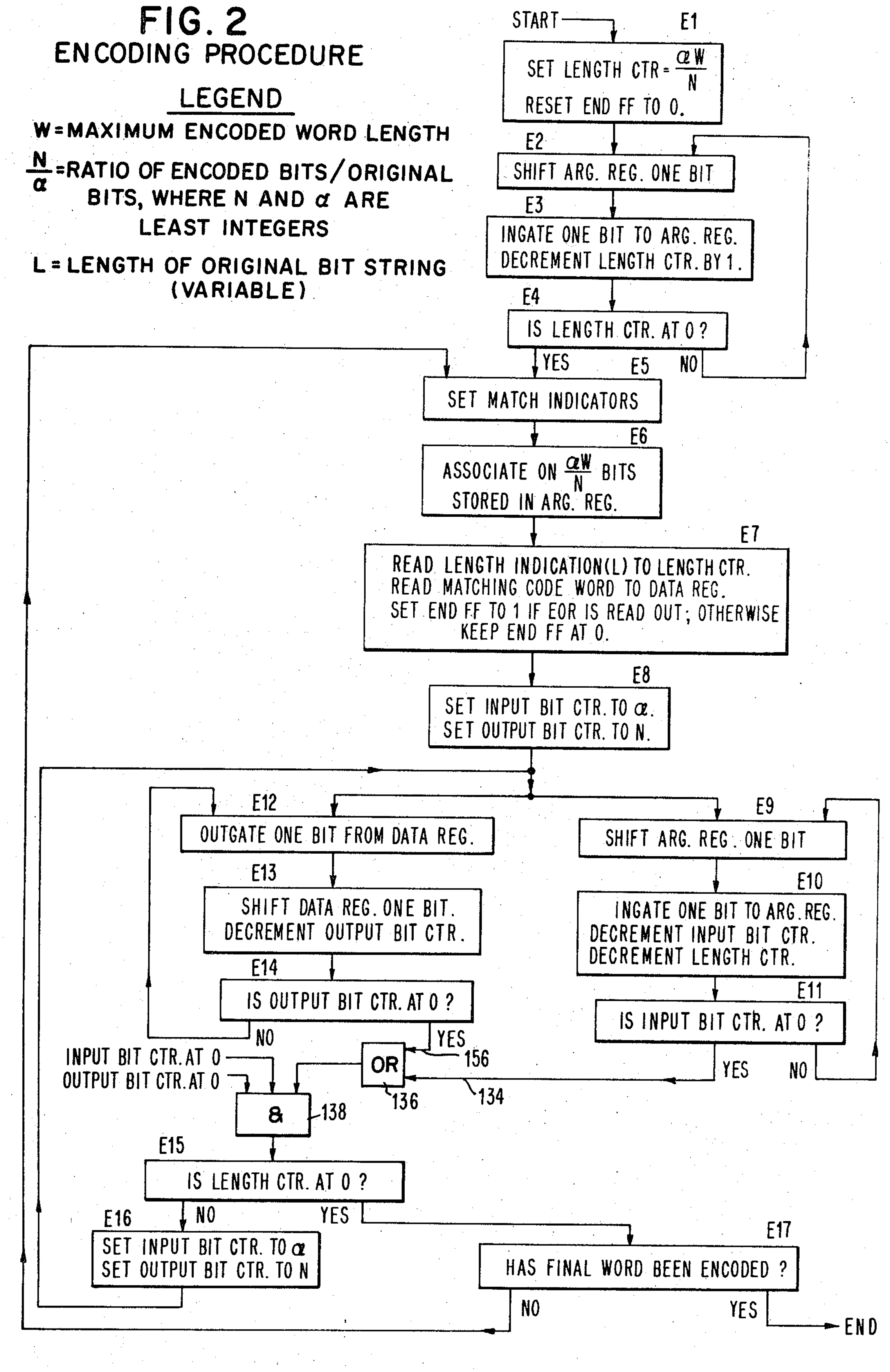
FIG. 2 is a general flowchart of an encoding procedure which can be executed by the system shown in FIGS. 1A and 1B.

A more detailed explanation of the encoding procedure now will be presented with specific reference to the flowchart shown in FIG. 2. The various steps of this flowchart are designated by reference numbers having an "E" prefix (e.g., E1, E2, etc.). These indicate steps of the procedure that are initiated by timing or clock pulses generated on wires bearing the same designations in the encoding clock circuitry shown in FIG. 4. Each of these clock pulses is generated by a single shot (SS) when it is turned on. For instance, when the single shot 40, FIG. 4, is turned on in response to a start pulse applied on wire 42, it generates a clock pulse on wire E1. This initiates the step of the encoding procedure designated E1 in FIG. 2, during which the length counter 34, FIG. 1B, is set to an initial value $\alpha W/N$, and a flip-flop 44, FIG. 1A, (the "END" flip-flop) is reset to its 0 setting. These two actions are accomplished by applying the E1 pulse to a gate 46, FIG. 1A, thereby enabling this gate to pass a preselected initial value $\alpha W/N$ into the length counter 34, FIG. 1B, and applying an E1 pulse also to the 0 input side of the END flip-flop 44, FIG. 1A.

When the single shot 40 goes off, FIG. 4, it sends a pulse through an OR circuit 48 to a single shot 50, which turns on to generate the E2 clock pulse for initiating step E2 of the encoding procedure, FIG. 2. Referring to FIG. 1A, in conjunction with FIG. 2, it can be that the E2 pulse is applied to a means for effecting a leftward shift of the argument register 30 by one bit position, preparing this register to receive an incoming bit from the original bit stream.

As single shot 50, FIG. 4, goes off, it causes the single shot 52 to turn on and generate the E3 clock pulse. This initiates step E3, FIG. 2, wherein the E3 pulse is applied to a gate 54, FIG. 1A, enabling a bit to be ingated to the argument register 30. Also, at this time, the E3 clock pulse is applied through an OR circuit 56, FIG. 1B, to a device for decrementing the length counter setting by 1. Thus, a bit has entered the argument register 30 and the length counter setting has been correspondingly decremented.

When single shot 52, FIG. 4, goes off, it causes single shot 58 to turn on and generate an E4 clock pulse. This initiates a test of the length counter setting to see whether it has been reduced to 0. The E4 pulse is applied to a gate 60, FIG. 1B, for passing the 0 or not-0 output, as the case may be, from a converter 62 associated with the length counter 34. The function of the converter 62 is to energize an output line 64 if the length counter setting is 0 and to energize an output line 66 if this setting is other than 0. In the present instance it will be assumed that the not-0 line 66 is energized, since the length counter setting has not yet been reduced to 0. In this condition, when gate 60 is activated by the clock pulse E4, energization will be extended from wire 66 through this gate 60 to a wire 68, FIGS. 1B and 4, and thence through OR circuit 48 to the single shot 50, causing this single shot to be again turned on for generating an E2 clock pulse. Referring to FIG. 2, this reinitiates the sequence of steps E2, E3 and E4, during which the argument register 30, FIG. 1A undergoes a left shift, a new bit enters this register 30, the setting of length counter 34 is reduced by 1 and the length counter again is tested to see whether it has been reset to 0. This sequence of steps E2, E3 and E4 will repeat itself as many times as needed to bring the first set of $\alpha W/N$ bits into the argument register 30. When all of these bits have been entered, the next test of the length counter setting (at step E4) reveals that this setting has gone to 0.

Referring to FIG. 1B, the activation of gate 60 by clock pulse E4, occurring when the 0 output line 64 from converter 62 is energized, causes such energization to be extended through gate 60, wire 70 and OR circuit 72, FIG. 4, to a single shot 74, which thereupon turns on to generate clock pulse E5. This initiates a new sequence of steps E5, E6 and E7, FIG. 2, during which the decoding actually is performed.

Figure 12:
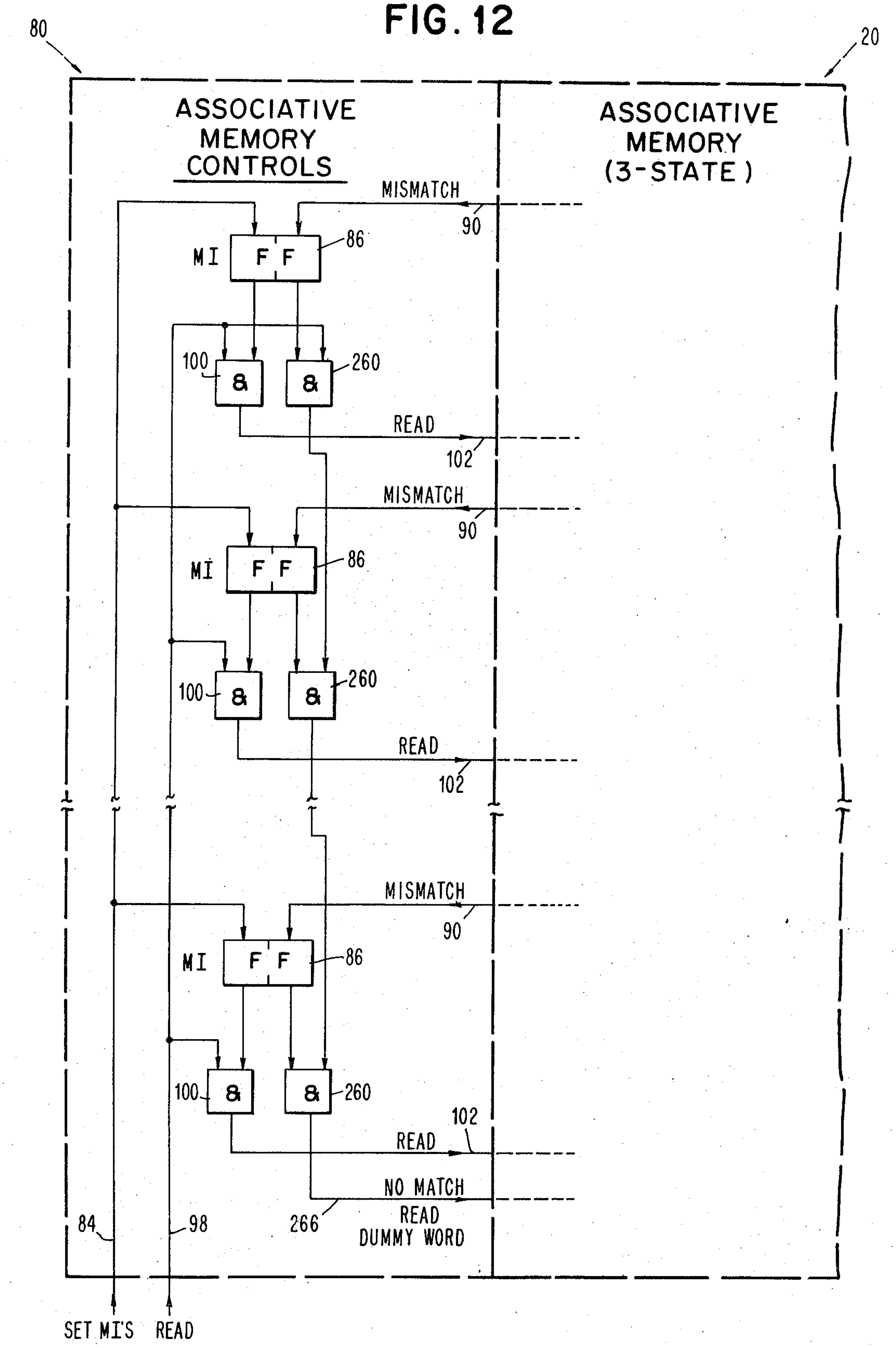
FIG. 12 is a diagram of the associative memory control circuitry.

Thus, when the clock pulse E5 is generated, it sets the various match indicators of the associative memory controls 80, FIGS. 1A and 12, to their 1 states. Specifically, the E5 clock pulse is extended through an OR circuit 82, FIG. 1A, to a wire 84, FIG. 12, which is connected in parallel to the 1 input terminals of the match indicator flip-flops 86 in the associative memory controls 80. This conditions the associative memory controls for a search operation.

When single shot 74 goes off, FIG. 4, it turns on a single shot 88 to generate an E6 clock pulse, which energizes as "associate" line for the argument register 30, FIG. 1A. This causes the associative memory 20 to search for a word in memory section 24 that will match the contents of the argument register 30. A match occurs when the pattern of significant bits in any of the words stored in memory section 24 matches the correspondingly positioned bits in argument register 30. Thus, for instance, assuming that the (1,8) code is being used, if the two leftmost positions of argument register 30 contain 0's, then a match will exist between this argument and the topmost word in memory section 24, FIG. 6. The remaining bits in the argument register 30 would be ignored in this case, because the remaining cells of that row in the associative memory section 24 are set to their "don't care" state. Hence a match would be established between the argument 00 and the stored word 00, regardless of the remaining bits in argument register 30.

The words stored in section 24 of associative memory 20, which represent all original bit strings that may be encoded, are so selected that no word may constitute the beginning of a longer word in this same set. Thus, referring to FIG. 6, for example, since the first word in memory section 24 is 00, none of the other encodable words stored in section 24 may begin with 00. In this connection, however, it should be noted that there is a special row of cells in section 24 which contains a dummy word consisting entirely of 0's. This dummy word is in a different category, representing a "no match" condition which may be encountered only during decoding operations. It is not utilized during encoding operations and will be dealt with specifically when the decoding operations are described. During encoding operations it is assumed that for every argument which is stored in argument register 30, FIG. 1A, there will be a unique match between it and one of the words stored in memory section 24, exclusive of this dummy word.

Referring again to FIG. 12, the presence of a non-matching word in any row of the associative memory section which is being searched ( section 24, in this instance) will cause a signal to be generated on the mismatch line 90 for that row of cells. This mismatch signal is applied to the 0 input terminal of the related match indicator flip-flop 86, resetting it to its 0 state. Since it is assumed that there will be only one row of cells which contains a matching word, mismatch signals will be generated for all rows except the one in which this matching word is stored. Hence, only one of the match indicators 86 will remain in its 1 state, the others being reset to 0.

When single shot 88, FIG. 4, goes off, it sends a pulse through a wire 92 for turning on the next single shot 94 to generate an E7 clock pulse, which is applied through an OR circuit 96, FIG. 1A, to a read line 98, FIG. 12. Associated with each match indicator 86 is an AND circuit 100. One input terminal of each AND circuit 100 is connected to the read line 98, the other input terminal being connected to the 1 output terminal of the respective match indicator 86. If the match indicator is in its 1 state, energization is extended through the respective AND circuit 100 to the respective read wire 102, thereby conditioning for readout the row of memory cells which stores the matching word, i.e., the word that matches the argument stored in argument register 30, FIG. 2A. All other read lines 102 will remain inactive. As mentioned hereinabove, there will be one and only one matching word during every encoding operation.

Section 22 of associative memory 20, FIG. 1A, now has been conditioned for readout of the encoded word stored in the row of cells which contains the matching original word in memory section 24. When the E7 timing pulse is generated as above described, this pulse is applied also to a gate 104, FIG. 1A, for thereby coupling the output of memory section 22 to the input side of data register 32. This enables the encoded word corresponding to the encoding argument to be gated into the data register 32, where it is now available for serial readout.

As still another incident to generation of the E7 timing pulse, a gate 106, FIG. 1A, is activated for transferring the related length indication L from the memory section 26 into the length counter 34, FIG. 1B. The length setting therefore denotes the number of significant bits contained in the original word that was just used as an encoding argument.

When single shot 94, FIG. 4, goes off it turns on single shot 108 to generate an E8 clock pulse. As indicated in the flowchart, FIG. 2, this has the effect of setting the input bit counter 38, FIG. 1B, to the value $\alpha$ and setting the output bit counter 36 to the value N. As explained above, the value N represents the number of data bits to be read out of the data register 32, FIG. 1A, for every $\alpha$ bits of data entered into the argument register 30. That is to say, the ratio $N/\alpha$ is the fixed relationship between the number of bits in the encoded word and the number of bits in the original bit string from which this encoded word was derived.

Referring again to FIG. 4, when single shot 108 goes off it sends a pulse through OR circuits 110 and 112 to a single shot 114, and also sends a pulse through OR circuits 110 and 116 to a single shot 118. There now follows a phase of the encoding operation during which two subsequences E9–E11 and E12–E14, FIG. 2, are performed concurrently. During steps E9–E11, $\alpha$ bits of data are serially fed into the argument register 30, FIG. 1A, the contents of which are shifted leftward accordingly. During steps E12–E14, N bits of data are serially read out of the data register 32, the contents of which are shifted leftward accordingly. These two concurrent subsequences are performed as many times as needed ( as determined by the length counter setting) for bringing a new argument into position for association in the argument register 30 and to complete the readout from data register 32 of the code word that has just been encoded.

To consider the operations just described in detail, when single shot 114, FIG. 4, goes on, it generates an E9 clock pulse, which is effective to shift the contents of argument register 30, FIG. 1A, leftward one bit. When single shot 114, FIG. 4, goes off, it causes single shot 120 to go on for generating an E10 clock pulse. This action has three effects. First, it activates the gate 54, FIG. 1A, for enabling a bit to be entered into the argument register 30. Second, it causes the input bit counter 38, FIG. 1B, to be decremented by 1. Third, it causes the setting of length counter 34 to be decremented by 1.

When single shot 120 goes off, it causes single shot 122, FIG. 4, to turn on, thereby generating the E11 clock pulse. This causes the setting of the input counter 38, FIG. 1B, to be tested for determining whether the same has been reduced to 0. Associated with the input bit counter 38 is a converter 128, which produces an output signal on a line 124 if the input bit counter setting is not 0 and produces a signal on another output line 126 if the input bit counter setting has gone to 0. The E11 clock pulse is applied to a gate 130, FIG. 1B, and if the not-0 line 124 is energized ( as will be assumed for the present), such energization will be extended through gate 130 to a wire 132, FIGS. 1B and 4, and OR circuit 112 to the single shot 114. Therefore, until the input bit counter setting is reduced to 0, the sequence of steps E9–E11, FIG. 2, is repeated.

Eventually, when $\alpha$ new bits have entered the argument register 30, FIG. 1A, the setting of input bit counter 38, FIG. 1B, returns to 0. Under these conditions, when the E11 clock pulse is generated, the gate 130 extends energization from the 0 line 126 to a wire 134 and thence through OR circuit 136 to one terminal of an AND circuit 138, FIGS. 1B and 2. A second input to AND circuit 138 is supplied by the 0 line 126 from the input bit counter. However, the AND circuit 138 remains inoperative until a third input is supplied to it when the setting of the output bit counter 36 returns to 0. Hence, the return of the input bit counter setting to 0 has the effect of suspending further performance of steps E9–E11, FIG. 2, but has no further effect until the setting of the output bit counter has returned to 0.

When single shot 118, FIG. 4, is turned on as described above, it generates the E12 clock pulse for outgating a bit from the data register 32. This action is effected by applying the E12 clock pulse to a gate 140, FIG. 1A, through which the outgated bit passes. This is the first of N bits which are to be outgated from the data register 32.

When single shot 118 turns off, single shot 142 turns on to generate the E13 clock pulse. This has two effects. First, it causes the contents of data register 32 to be shifted leftward by one bit. Second, it causes the setting of the output bit counter 36 to be decremented by 1, as indicated in FIG. 1B.

When single shot 142 goes off, it causes single shot 144 to turn on for generating the E14 clock pulse. This causes the setting of output bit counter 36, FIG. 1B, to be tested. Associated with counter 36 is a converter 146 which furnishes an output signal on line 148 if the output bit counter setting is not at 0 and furnishes an output signal on line 150 if the output bit counter setting has returned to 0. The E14 clock pulse is applied to a gate 152, and if the not-0 output line 148 is energized, such energization is extended through the gate 150, a wire 154, FIGS. 1B and 4, and OR circuit 116 to the single shot 118. Such action causes the sequence of steps E12–E14, FIG. 2, to be repeated. This action occurs as many times as needed to outgate N bits of data from the data register 32 and cause the output bit counter setting to return to 0.

Assuming that the setting of the output bit counter 36, FIG. 1B, has returned to 0, the application of clock pulse E14 to the gate 152 will cause energization to be extended from the 0 line 148 through gate 152, wire 156 and OR circuit 136 to the AND circuit 138. Since both bit counter settings now are at 0, the AND circuit 138 receives inputs from the 0 setting lines 126 and 150 as well as from the OR circuit 136. Hence, a signal is passed through AND circuit 138 and wire 160, FIGS. 1B and 4, to a single shot 162 in the clock pulse generator.

As single shot 162 turns on, it generates the E15 clock pulse, which is applied to a gate 164, FIG. 1B. If the length counter setting is not at 0, a not-0 signal is passed by gate 164 from the not-0 output line 66 through a wire 170 to the single shot 172, FIG. 4.

As single shot 172 turns on, it generates the E16 clock pulse, and from FIGS. 2 and 1B, it is evident that this action restores the setting of input bit counter 38 to $\alpha$ and also restores the setting of output bit counter 36 to N. As single shot 172, FIG. 4, goes off it sends a pulse through OR circuit 110 thence through OR circuits 112 and 116 to the single shots 114 and 118, respectively. This reinitiates the two sequences E9–E11 and E12–E14, FIG. 2. As a result, an additional group of $\alpha$ bits is entered serially into the argument register 30, FIG. 1A, and an additional group of N bits is read serially out of the data register 32.

The sequence of steps E9–E16, FIG. 2 is repeated as many times as needed to reduce the length counter setting to 0. When this condition is attained, it signifies that L new bits have been read into the argument register 30 and that a related number of bits ( equal to $NL/\alpha$) has been read out of the data register 32. Thus, an entire variable-length code word has been read out of data register 32, and a succeeding bit string which is to be encoded will have been positioned at the proper place for association in the argument register 30. Under these circumstances, when the E15 clock pulse is generated, current passes from the 0 output line 64 of the length counter converter 62, FIG. 1B, through gate 164 and wire 176 to single shot 178, FIG. 4. As single shot 178 turns on, it generates a clock pulse E17 to initiate a test for determining whether the final word has been encoded. The means for performing this test now will be described:

It will be assumed herein that each record or message which is to be encoded will terminate in a recognizable end-of-record (EOR) code representation. For instance, one of the encoded words stored in the associative memory section 22 could be regarded as a EOR representation. The original bit stream will terminate in a string of bits which is converted into this EOR representation. Associated with the data register 32 is an encoded EOR detector 180, FIG. 1A. When an EOR code is read out to data register 32 from the associative memory 20, the EOR detector 180 generates an output signal on wire 182. This signal passes through an OR circuit 184 to the 1 input terminal of the END flip-flop 44, setting this flip-flop 44 to its "1" state.

When the END flip-flop 44 is in its "1" state, it applies an output signal to a conductor 188. If the flip-flop 44 is at "0", it will energize an output conductor 186. Whether the wire 186 or 188 is energized depends upon whether the EOR detector 180 has detected an EOR code in the data register 32. If the end of the record has not yet been reached at the time when the clock pulse E17 is generated, wire 186 is energized; otherwise it will be wire 188 that is energized.

Clock pulse E17 is applied at the appropriate time to a gate 190, FIG. 1A. If the end of the record has not yet been reached, current passes from wire 186 through gate 190, wire 192 and OR circuit 72, FIG. 4, to the single shot 74. This causes single shot 74 to turn on for generating a clock pulse E5 and thereby initiating a new encoding sequence commencing with step E5 in FIG. 2. The system then proceeds to encode the new argument now standing in argument register 30.

It will be noted that this new encoding operation does not commence until all of the bits of the previously encoded word have been read out of the data register 32, and it commences as soon as the last bit of the old code word has been read out. Thus, there is no delay or hiatus between the encoding of successive code words.

If the E17 clock pulse is generated at a time when the END flip-flop 44 is in its "1" state, indicating that an EOR code word was generated, then the gate 190, FIG. 1A, will pass current from the EOR line 188 to a suitable means for ending the encoding operation of the system. The EOR code word meanwhile has been shifted out of the data register 32 to form the final part of the encoded message.

DECODING

The decoding procedure now will be described with reference to FIGS. 1A, 1B, 3 and 5–12.

Referring first to FIG. 1B, the bits of the encoded bit stream are fed serially into an input register 200. The bit-storing positions of this register 200 are represented as being serially numbered from 1 up. Register 200 is a shift register, and its contents are intermittently shifted one bit position at a time toward the left ( as viewed in FIG. 1B) while the decoding operation progresses. The time interval which elapses between successive shifts (or the time interval preceding the first shift, as the case may be) is herein designated a "shift interval".

Figure 8:
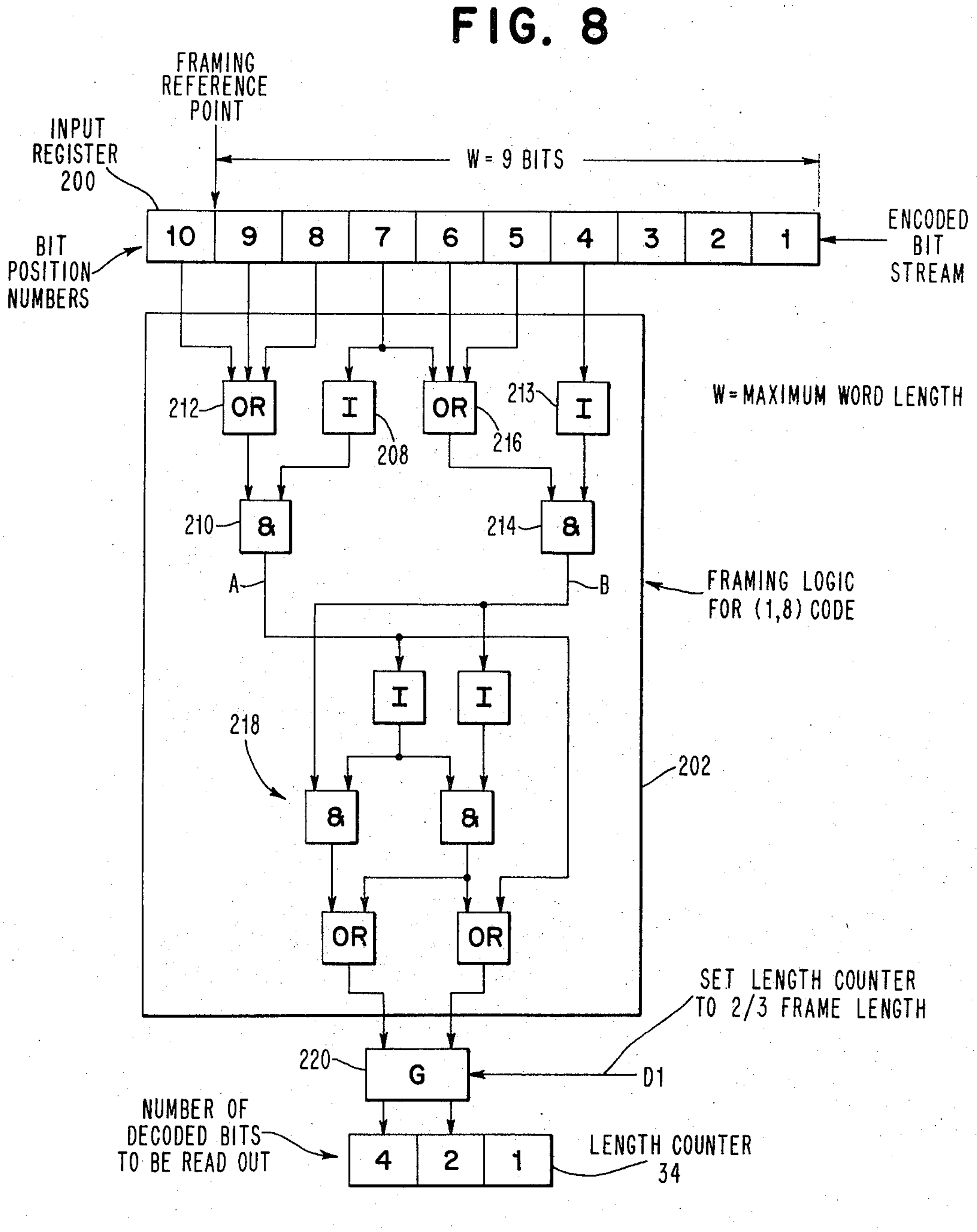
FIGS. 8 and 9, respectively, are diagrams of the framing logic circuitry utilized by the system shown in FIGS. 1A and 1B for making the framing decisions with respect to $dk$-limited, variable-length codes in which the ( $d,k$) constraints are ( 1,8) and (2,7), respectively.
Figure 9:
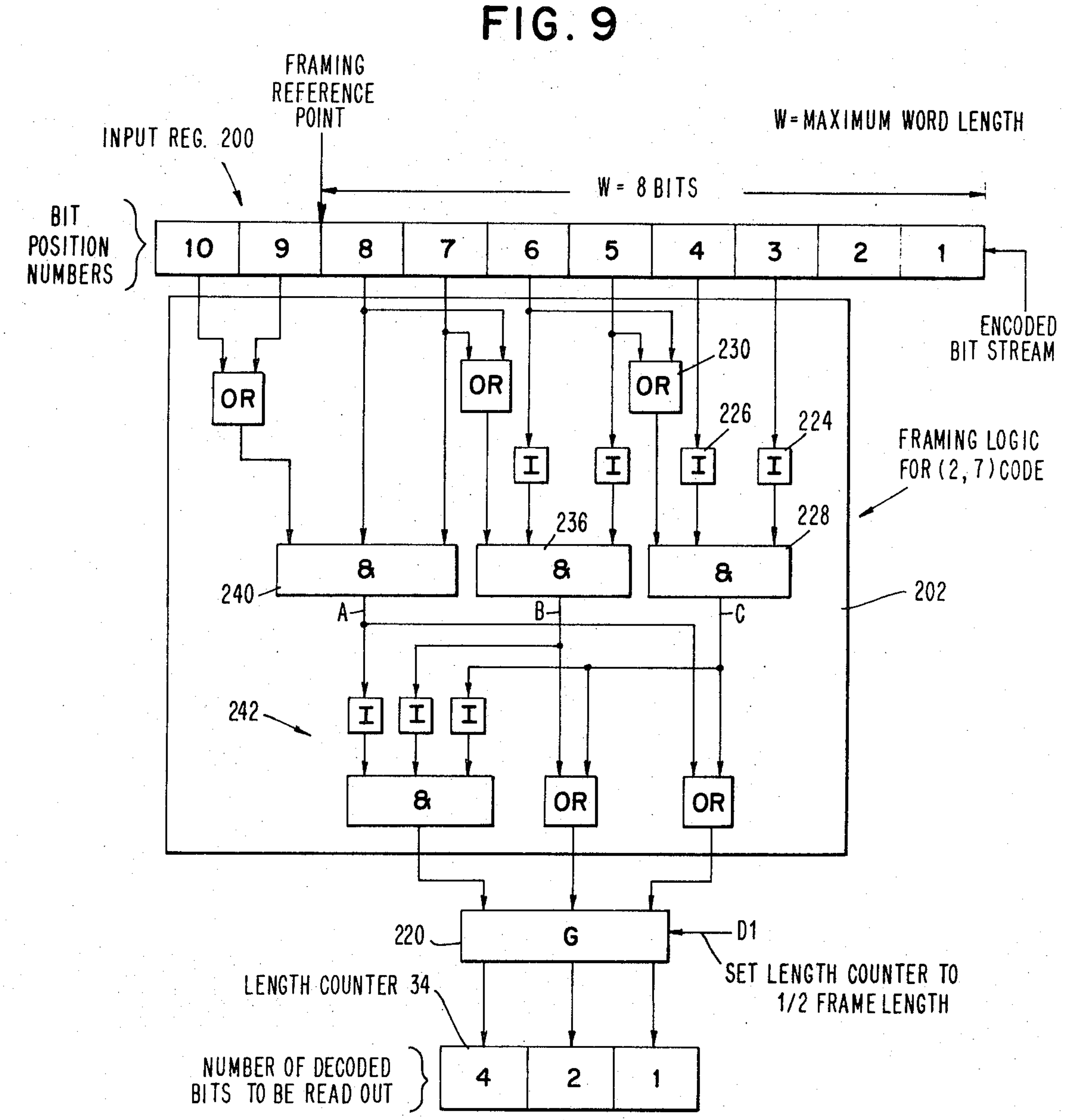

The purpose of storing the bits of the encoded bit stream in the input register 200 is to enable certain framing tests to be performed upon a certain portion of this bit stream containing W bits, where W is the maximum word length. In the case of the (1,8) code shown in FIG. 6, for example, W is equal to 9 bits. In the case of the (2,7) code shown in FIG. 7, W is equal to 8 bits. The point in register 200 which is intermediate the W'th and the (W+1)'th bit position in register 200 is known as the "framing reference point". For the (1,8) code, the framing reference point lies between the 9th and 10th bit positions in register 200, as shown in FIG. 8. For the (2,7) code, the reference point lies between the 8th and 9th bit positions in register 200 as shown in FIG. 9. This framing reference point actually marks the leading end of a W-bit decoding argument which, at an appropriate time, will be transferred to an argument register 204 of the associative memory 20, FIG. 1A. Any of the bits in input register 200 which at that time are positioned to the right of the framing reference point will be included in this argument, even if the frame length is less than W.

Associated with the input register 200 is a framing logic unit 202, FIG. 1B. This unit 202 contains logic circuitry for making the framing decisions with respect to the incoming bit stream. That is to say, it decides at which points the bit stream should be divided in order to mark the beginnings and ends of the constituent code words therein. In effect, it determines the length of each of the variable-length frames containing the respective code words. The particular logic circuitry employed in the unit 202 will depend upon the code that is being used. FIG. 8 shows the framing logic circuitry for the (1,8) code, and FIG. 9 shows the framing logic circuitry for the (2,7) code.

The framing logic unit 202 determines in advance the length that the decoded word will have. To be more specific, the unit 202 first determines the current frame length, i.e., the length of the code word which is to be decoded. Then, the unit 202 furnishes as itsoutput a binary representation of this frame length divided by the ratio $N/\alpha$ of encoded bits to original bits. This length value is entered into the length counter 34, FIG. 1B at the appropriate time. The length counter setting then controls the decoding operation, which follows in due course.

The decoding operation involves, first, making a parallel transfer of the bits stored in the first W positions of input register 200 into the argument register 204, FIG. 1A, for use as the decoding argument. As association then is performed on this W-bit decoding argument to find a matching code word in section 22 of the associative memory 20. If a match is found, the corresponding decoded word is read out of memory section 24 to a data register 206, from which it is thereafter read out in serial bit-by-bit fashion.

Both the code word stored in the argument register 204 and the decoded word which is read out to the data register 206 have variable lengths. The number of bits read out from the data register 206 will be controlled by the decoded word length, which already has been ascertained by the framing logic unit 202. Likewise, the number of new bits which are fed into the input register 200 is controlled in accordance with the frame length, as ascertained by the unit 202. Both the framing are performed under control of the length counter setting.

During the period while the bits of the decoded word are being read out of the data register 206 and new bits are being entered into the input register 200, no decoding function is performed by the associative memory 20, nor is any framing logic test performed by the unit 202. As already explained, these two functions are performed only once per frame, after the word just decoded is replaced with a new code word. The framing logic test is performed when this new code word has been registered at the framing reference point (FIG. 8 or FIG. 9).

If the code word registered in the input register 200 is incorrectly represented due to faulty encoding or bit detection, the framing logic unit 202 nevertheless makes a framing decision which represents the best choice that can be made under the circumstances. If no match can be found between the incorrect code word and any of the encoded words stored in memory section 22, FIG. 1A, a dummy word (assumed to consist of all 0's) is read out to the data register 206. A new code word is positioned for testing in the input register 200, and the decoding operation continues as though a valid decoding action had just taken place. Detection of the first valid word-ending which follows the erroneous portion of the incoming message will restore synchronism.

The internal circuitry of the framing logic unit 202, FIG. 1B, is designed according to the particular coding scheme that is being employed. FIG. 8 shows the logic circuitry of the unit 202 where the system is designed to utilize a (1,8) run-length-limited code, that is to say, one in which the *d* constraint is 1 and the *k* constraint is 8. FIG. 9 shows the framing logic circuitry 202 for a (2,7) run-length-limited code system. In general, the purpose of this logic circuitry is to check the pattern of bits currently stored in the input register 200 to see whether a word-ending can be detected at any of certain strategic points within this series of bits. In making this test, the low-numbered bit positions are ignored, and an attempt is made to find a word-ending somewhere within the remaining portion of the bit series stored in register 200. If no such word-ending can be detected in that portion of the series, it is assumed then that a code word of maximum length (W bits) is stored in the register 200, and the decoding operation is performed accordingly. This may or may not be a correct assumption, but it is the only decision that can be made under those particular circumstances. If it is an incorrect decision, reliance is placed upon the word-ending tests that will be performed by the unit 202 upon the succeeding portion of the bit stream, after it enters the input register 200, in an attempt to find a valid word-ending therein.

Referring now to FIG. 8, which shows the framing logic circuitry for the (1,8) code, and to FIG. 6 which shows the code conversion table for this particular run-length-limited code, it may be noted first that all encoded words in this system will have lengths of three, six or nine bits, 9 being the maximum code word length. Moreover, it may be noted that every encoded word will end in not less than one and not more than three 0's. Hence, it can be said in general of all code words in the (1,8) coding system that they will contain at least one 0 located at the No. 1, No. 4, or No. 7 bit position, depending upon the length of the code word. If there is a 0 at position No. 7, and a 1 is located at position No. 8 or No. 9, then it is reasonable to assume that one of the three-bit code words in this system is currently stored in bit positions 7, 8 and 9 of input register 200. The framing logic circuitry shown in FIG. 8 recognizes this fact. Thus, the 0 output from bit position 7 is inverted by an inverter 208 and applied as a 1 input to an AND circuit 210. The 1 output from bit position 8 or 9, as the case may be, passes through an OR circuit 212 and is applied as a second input to the AND circuit 210. Under these conditions a signal is generated on an output wire A of AND circuit 210, this signal being herein referred to as a "satisfaction" signal.

Referring again to the coding table shown in FIG. 6, if there is a 0 currently stored in bit position No. 4, FIG. 8, and a 1 is stored in any of bit positions 5, 6 and 7, then it is reasonable to assume that one of the four six-bit code words currently is stored in positions 4–9 of the input register 200. Under these conditions, the 0 output from bit position 4 is inverted to a "1" by the inverter 213, FIG. 8, and is applied in that form to an AND circuit 214. The 1 output from position 5, 6 or 7 passes through an OR circuit 216 and is applied as the other input to the AND circuit 214. This generates an output signal on the wire B leading from the output side of the AND circuit 214, referred to herein as a "-satisfaction" signal.

No logic circuitry is associated with the three lowermost bit positions 1, 2 and 3 of the input register 200. If no satisfaction signal is generated on either of the wires A and B, the only alternative is to treat the entire nine-bit sequence stored in positions 1–9 of register 200 as a nine-bit code word, whether or not this is a valid assumption. Hence, there would be no purpose in testing for a word-ending point at position No. 1. If the sequence of bits stored in positions 1–9 of register 200 is not a true code word, the next sequence of nine bits will in all probability contain a valid word-ending.

The framing decision table in the lowermost part of FIG. 8 denotes the framing decisions that are made under various circumstances according to the presence or absence of satisfaction signals on the wires A and B of the logic unit 202. As just indicated, if no signal is present on either wire A or wire B, the frame length is assumed to be nine bits. A satisfaction signal on wire B alone indicates a frame length of six bits, while a satisfaction signal on wire A alone indicates a frame length of three bits. If a satisfaction signal appears on wire A at the same time that a satisfaction signal is on wire B, this denotes an error condition which is present in at least one of the two groups of bit positions 4–6 and 7–9. This question is resolved in the design of the logic circuitry by assuming that the error occurs within the group of bit positions 7, 8 and 9, requiring that only these three bits be replaced. Therefore, the frame length is assumed to be three if satisfaction signals are detected on both of the wires A and B.

The portion of the logic circuitry generally designated 218 in the lower part of the unit 202, FIG. 8, converts the pattern of signals on wires A and B into a length counter setting which, in this case, is two-thirds of the indicated frame length. It will be recalled that the length counter setting denotes the length of the decoded word, and in the (1,8) run-length-limited coding system, according to the present invention, the decoded word length is always two-thirds that of the corresponding encoded word length. At the appropriate time in the decoding operation, the output of the logic circuitry 218 is passed through a gate 220 for entering the appropriate value into the length counter 34. Thus, for example, if the indicated frame length is six bits, then the binary value 100, or decimal 4, is entered into the three lowermost bit positions of the length counter 34. The corresponding decimal values of these three bit positions in counter 34 are indicated in FIG. 8.

It will be noted that the OR circuit 212, FIG. 8, has three inputs, which in this instance come respectively from the bit positions 8, 9 and 10 of the input register 200. Position No. 10 is beyond the framing reference point, and it contains the last bit of the previously decoded word. If the code words have been correctly encoded and correctly detected, there will always be a 0 stored in register position 10. If a "1" is standing in position No. 10, this indicates either that the bit is erroneous or that some misframing has occurred which causes a "1" to appear in that particular position. Under these circumstances one cannot be certain that the bit stored in position No. 9 actually is the beginning of a new code word. As a specific example, assume that the sequence of bits 001000 is stored in bit positions 9–4 of register 200, and that a "1" is stored in position 10. Normally it could be assumed that the bits stored in positions 9–4 constitute a six-bit code word which begins at position 9 and ends at position 4. The presence of the "1" in position 10, however, indicates that this may not be true. Hence, if a satisfaction signal were generated on wire B alone, this might be a faulty indication of frame length. However, by feeding the output of position 10 through OR circuit 212 to the AND circuit 210, this causes a satisfaction signal to be generated on wire A also, so that the frame length is indicated as three bits rather than six bits. By replacing the lesser number of bits in the register 200 when this type of error condition occurs, the next word-ending test will be made after only three bits rather than six bits have been moved out of the register 200. This avoids the risk of discarding three bits which may not be in error.

Referring now to the code conversion table for the (2,7) code shown in FIG. 7, it is seen that all code words in this system, if correctly encoded, will contain either four, six or eight bits. Furthermore, each valid code word in this system will end in not less than two and not more than three 0's. Now referring to FIG. 9, which shows the framing logic unit 202 for the (2,7) code system, it may noted that under normal conditions one may expect a pair of 0's to be stored at either positions 1 and 2, or positions 3 and 4, or at positions 5 and 6 of the input register 200. The presence of such 0 pairs at the positions specified indicates the possibility of a valid code word ending at one of those places. It is possible also for 0's to appear in positions 7 and 8, but under these circumstances there also should be 0's stored in positions 9 and 10. Normally positions 9 and 10 will store the last two bits of the preceding code word, which has just been decoded, and these bits should be "0" if no error has been made. Positions 7 and 8 normally will start the first two bits of the current code word which is to be encoded. The conditions that may prevail if errors exist in the code word representation will be dealt with shortly hereinafter.

The logic circuitry illustrated in FIG. 9 will test for a valid word-ending at position 3 or position 5 of the input register 200 and will test for an invalid word-ending at position 7. No logical test is made at position No. 1, because if none of the other tests are satisfied, it is assumed that the code word stored in register 200 is an eight-bit word. There is no purpose in making a word-ending test at position No. 1 since, in any event, the bits stored in positions 1–8 of register 200 will have to be replaced for the next decoding operation, if the other word-ending tests are not satisfied.

To consider the details of the circuitry in unit 202, FIG. 9, the outputs of positions 3 and 4 of register 200 are inverted by the inverters 224 and 226 and are applied to the AND circuit 228. The output of position 5 or 6 may be applied through the OR circuit 230 as an additional input to the AND circuit 228. If 0's are present in both positions 3 and 4, and a "1" is present in either or both of positions 5 and 6, AND circuit 228 generates a satisfaction signal on its output wire C. By referring to the framing decision table in the lowermost part of FIG. 9, it is seen that the presence of a satisfaction signal on wire C indicates a frame length of six bits. This corresponds to a length counter setting of 3.

In similar fashion, the presence of 0's in positions 5 and 6, and the presence of a "1" at either or both of positions 7 and 8, will result in the generation of a satisfaction signal on a wire B by an AND circuit 236. If a signal appears on wire B, then it is not possible for a signal to appear also on wire C or on wire A ( soon to be described) in this particular scheme. The presence of this signal on wire B denotes that a code word having a frame length of four bits has been detected, such word being stored in positions 5–8 of the register 200. The frame length of 4 corresponds to a length counter setting of 2.

The portion of the logic circuitry designated 242 in FIG. 9 converts the satisfaction signals on wires A, B and C into equivalent length counter settings according to the framing decision table. Thus, at the appropriate time, the gate 220 is pulsed for enabling the output of the logic circuitry 242 to be applied to the length counter 34.

The AND circuit 240 will generate a satisfaction signal on wire A if there are 0's in positions 7 and 8 and "1" appears at either or both of the positions 9 and 10 of input register 200. This denotes an error condition, because if the words were correctly coded and detected, this particular bit combination would not appear in positions 7–10 of register 200. Let us assume, for example, that the bit sequence 001000 is stored in positions 8–3 of input register 200 and that a "1" is stored in either position 9 or or 10. Normally the bit sequence 001000 in positions 8–3 would be interpreted as a six-bit code word, causing a satisfaction signal to appear on wire C. However, the presence of a "1" in position 9 or 10 indicates that this may not be the case. Nevertheless, the logic circuitry is designed to give the benefit of a doubt to the possibility that a valid word-ending exists in bit position No. 3. Hence, the presence of signals on wires A and C has the same effect as a signal on wire C alone.

If a signal appears on wire A alone, this indicates that there was an error in the code group that just previously was decoded, and it also indicates that the register positions Nos. 1–8 do not contain a code word of length four bits or six bits. It is possible that a code word of length eight bits may be stored in those positions. In this instance, however, no assumption is made in favor of an eight-bit code word. Instead, it is arbitrarily assumed that the frame length is two bits, and after two new bits have been fed into register 200, another attempt is made to find a valid code word-ending.

These framing decisions are to a certain extent arbitrary insofar as the use of the A signal is concerned. Experience may indicate a different choice of framing decisions when an error condition is detected. This is optional with the designer of the equipment.

Figure 3:
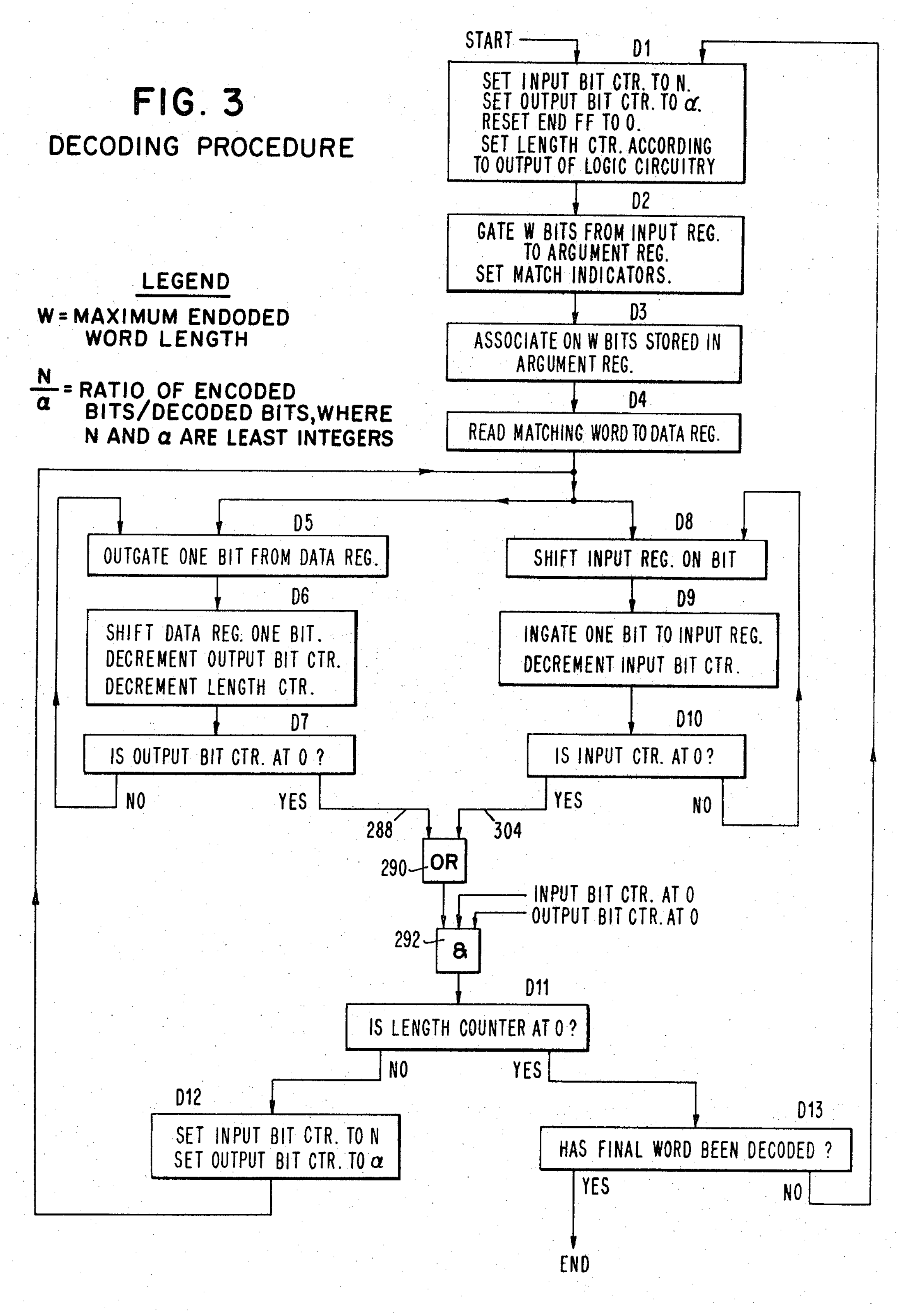
FIG. 3 is a general flowchart of a decoding procedure which can be executed by the system shown in FIGS. 1A and 1B.

The decoding procedure now will be described in detail with reference to the flowchart shown in FIG. 3. To initiate the decoding procedure, a start pulse is applied through an OR circuit 250, FIG. 5, to the single shot 252 in the decoding clock. As single shot 252 turns on, it generates a D1 clock pulse which causes several actions to occur. First, the quantity N is entered into the output bit counter, and the quantity $\alpha$ is entered into the output bit counter, FIG. 1B. Thus, for every $\alpha$ bits read out of the decoding data register 206, a corresponding N bits will be entered into the input register 200. Second, the END flip-flop 44, FIG. 1A, is reset to 0. Further, the D1 clock pulse is applied to the gate 220, FIGS. 1B, 8 and 9 for causing the length counter 34 to be set in accordance with the decoded word length value that has been determined by the framing logic unit 202, based upon the information stored in the input register 200.

At this point it should be explained that the input register 200 always is left in a clear state ( all 0's) at the conclusion of any decoding run, and this is the state in which register 200 is assumed to be at the start of a new decoding run. Under these conditions the contents of the input register 200 are treated as a maximum-length code word consisting of all 0's. By referring to FIG. 8 or FIG. 9, it can be seen that the absence of any satisfaction signal resulting from the word-ending tests performed by the framing logic unit 202 denotes the maximum word length. The system could, of course, be designed to operate differently so that the decoding operation proper does not start until the first W bits have been fed into the input register. This is considered a minor detail.

When the single shot 252, FIG. 5, goes off, it causes the single shot 254 to turn on, thereby generating the D2 clock pulse, which activates gate 256, FIG. 1B, enabling the information stored in the lowest-numbered W bit positions of input register 200 to be transferred in parallel to the decoding argument register 204, FIG. 1A. The D2 clock pulse also is applied to the wire 84, FIGS. 1A and 12, for setting the match indicators 86 in the associative memory controls 80 to their "1" states. This conditions the associative memory 20 for a search operation on the argument stored in the argument register 204.

When the single shot 254 turns off, the single shot 258 turns on to generate the D3 clock pulse. This pulse is applied to the "associate" line for the argument register 204 to initiate the search operation. Any rows of cells in associative memory section 22, FIGS. 1A, 6 or 7, which does not store a code word matching the argument in register 204 will generate a mismatch signal on its mismatch line 90, FIG. 12. The corresponding match indicator 86 thereupon is reset to 0. The matching code word, if there is one, is stored in the row of cells whose match indicator 86 remains in its "1" state.

Associated with each match indicator 86, FIG. 12, is an AND circuit 260, one input to which is supplied by the 0 output terminal of the related match indicator 86. If the match indicator has been reset to 0, this partially conditions the respective AND circuit 260 for conduction. The possible effect of this will be described presently.

When single shot 258 goes off, FIG. 5, single shot 262 turns on to generate the D4 clock pulse. This D4 pulse is applied to the read line 98, FIGS. 1A and 12, of the associative memory controls 80. For each row of memory cells in the associative memory 20, either one or the other of the AND circuits 100 and 260 assigned to that row will be in a conductive state, according to the setting of the associated match indicator 86. If there is a match indicator 86 in its "1" state, circuit will be completed from the read line 98 through the related AND circuit 100 to the respective read wire 102. Concurrently therewith, the D4 clock pulse is applied to a gate 264, FIG. 1A, causing the decoded word which corresponds to the matching code word to be read out of memory section 24 to the decoding data register 206. Hence, the data register 206 now contains the decoded word which corresponds to the code word in argument register 204.

As mentioned above, there is no assurance that the argument stored in register 204 will match any of the code words stored in memory section 22. The absence of a matching code word is indicated by the fact that all of the match indicators 86, FIG. 12, are reset to their 0 states, thereby conditioning all of the AND circuits 260 for conduction. Under this condition a series circuit is established from the read line 98 through all of the AND circuits 260 to a "no-match" line 266. Whenever the line 266 is energized, a dummy word (FIG. 6 or FIG. 7) is read out of the memory section 24 to the data register 206, FIG. 1A. In the present embodiment this dummy word is assumed to consist entirely of 0's. However, it could consist of any arbitrary bit pattern which will not cause malfunctioning of the system.

The decoded word now is standing in the data register 206. The length of the decoded word is indicated by the current setting of the length counter 34. It is now necessary to read out of data register 206 the number of bits indicated by the setting of the length counter 34. Correspondingly, an appropriate number of new bits must be fed from the encoded bit stream into the input register 200, FIG. 1B. The outgating of bits from data register 206 and the ingating of bits to input register 200 are conducted in such a fashion that for every $\alpha$ bits fed out of register 206, N bits will be fed into the input register 200, and this ratio of output bits to input bits will be maintained until the decoded word has been completely read out of the register 206. This ratio is indicated by the relationship between the current settings of the output bit counter 36 and the input bit counter 38, FIG. 1B.

Referring again to FIG. 5, when the single shot 262 goes off, a pulse is applied through OR circuit 268 and thence through OR circuits 270 and 272, respectively, to the single shots 274 and 276, thereby generating clock pulses D5 and D8. This action initiates two subsequences consisting of steps D5–D7, FIG. 3, and steps D8–D10, which will be considered separately.

The D5 timing pulse is applied to a gate 278, FIG. 1A, to cause the leading bit of the decoded word stored in register 206 to be gated out as part of the decoded bit stream. As single shot 274, FIG. 5, goes off, single shot 280 turns on to generate a D6 clock pulse. Such action has three effects. First, the D6 clock pulse energizes a shifting device for causing the contents of the data register 206 to be shifted leftward by one bit. Second, this same clock pulse also causes the setting of the output bit counter 36, FIG. 1B, to be decremented by "1". Third, it also causes the current setting of the length counter 34, FIG. 1B, to be decremented by "1".

When the single shot 280, FIG. 5, goes off, it turns on the single shot 282 for generating the D7 clock pulse. This activates a gate 284, FIG. 1B, for testing the output of the converter 146 associated with the output bit counter 36. If the output bit counter setting currently is not at 0, energization is extended from the not-0 output line 150 through the gate 284 to a wire 286, FIGS. 1B and 5, and thence through OR circuit 270 to the single shot 274, again turning this single shot on. This reinitiates the sequence of steps D5–D7, FIG. 2. This cycle is repeated as often as needed to bring the setting of the output bit counter down to 0. When this occurs, the next generation of the D7 clock pulse will cause current to flow from the 0 output line 148 of converter 146 through the gate 284, wire 288 and OR circuit 290 to one of the input terminals of AND circuit 292, FIG. 1A. Such action is without effect if the setting of the input bit counter 38 has not yet been reduced to "0".

Referring again to FIGS. 2 and 5, when the single shot 276 turned on, it generated a D8 clock pulse. This energizes the shifting device for the input register 200, FIG. 1B, causing the contents of this register to be shifted leftward by one bit. When single shot 276 goes off, single shot 294 goes on to generate the D9 clock pulse. This pulse is applied to a gate 296, FIG. 1B, for enabling a bit to be ingated from the encoded bit stream to the lowermost position of input register 200. At the same time the D9 clock pulse is applied to the decrementing device for the input bit counter 38 to reduce the setting of this counter by 1.

As single shot 294 goes off, it turns on the single shot 298, which generates a D10 clock pulse for testing the setting of the input bit counter 38. If N bits of information have not yet entered the input register 200, the input bit counter setting is not at "0". The non-0 output line 124 therefore is energized, and when the D10 clock pulse is applied to the gate 300, FIG. 1B, such energization is extended from wire 124 through gate 300 and wire 302, FIGS. 1B and 5, and thence through OR circuit 272 to the single shot 276, again turning this single shot on. This reinitiates the sequence of steps D8–D10, FIG. 2, and this cycle of steps is repeated as many times as needed to reduce the input bit counter setting to "0". When this condition has been attained, N bits of information will have been fed into the input register 200 to correspond with the α bits of information read out of the data register 206.

The application of the D10 clock pulse to the gate 300, FIG. 1B, at a time when the input bit counter setting is at "0" causes circuit to be extended from the 0 line 126 through gate 300, wire 304, and OR circuit 290 to AND circuit 292. At this time the output bit counter line 150 and input bit counter line 126 both are energized, denoting that both of the bit counter settings are at "0". AND circuit 292, therefore, conducts current to energize a wire 306, FIGS. 1B and 5, leading to the single shot 308. This single shot therefore turns on to generate a clock pulse D11 for testing the setting of the length counter 34, FIG. 1B.

If the length counter setting is not at "0", this indicates that the readout of the decoded word has not yet been completed. Hence, another set of α bits must be read out of the data register 206, and a corresponding set of N bits must be fed into the input register 200. Thus, the application of the D11 clock pulse to the gate 310, FIG. 1B, at a time when the not-0 line 66 from the length counter converter 62 is energized, causes such energization to be extended through gate 310 and wire 312 to the single shot 314, FIG. 5, which turns on to generate the D12 clock pulse. The effect of the D12 pulse is to cause the quantity N to be entered again in the input register 38 and the quantity α to be entered again into the output bit counter 36, FIG. 1B.

The sequence of steps D5–D12, FIG. 2, is repeated as many times as necessary to bring the length counter setting down to "0". The generation of the D11 clock pulse at a time when the length counter setting is "0" causes circuit to be extended from the "0" output line 64 of the length counter 34, FIG. 1B, through gate 310 and wire 316 to a single shot 318. The result of turning on the single shot 318 is to generate a D13 clock pulse for thereby initiating a test to determine whether the final word of the message has been decoded.

Referring to FIG. 1A, there is associated with the decoding data register 206 a unit 320 for detecting the presence of an end-of-record ( EOR) representation in the data register 206. This will be the decoded equivalent of the encoded EOR representation which terminates the encoded data transmission. This EOR representation can constitute any of the decoded words in the code conversion table ( FIG. 6 or FIG. 7, for example). It is recognized, of course, that an error condition may alter the EOR representation so that it is not recognized as such when it is read into the data register 206. This undesirable condition may be circumvented by any of several measures. For example, one may transmit a plurality of EOR representations on the probability that at least one of them will be correctly interpreted. As another alternative, a count could be maintained of the dummy words which are consecutively read out of the data register 206, and decoding operations can be halted if this count rises above a certain figure.

In the present instance it will be assumed that an EOR code has been correctly interpreted and has been detected by the EOR detector 320, FIG. 1A. A signal then passes from the energized output line 322 of detector 320 through the OR circuit 184 to the 1 input terminal of the END flip-flop 44, setting this flip-flop to its "1" state. Under these conditions, when the D13 clock pulse is generated by the single shot 318, FIG. 5, and this pulse is applied to the gate 324, FIG. 1A, energization is extended from wire 188 through the gate 324 to a suitable means for ending the decoding operations.

If an EOR code has not yet been detected at the time when the D13 clock pulse is generated, circuit is extended from the "0" output side of the END flip-flop 44, FIG. 1A, through the wire 186, gate 324, wire 326 and OR circuit 250 to the single shot 252, FIG. 5. As single shot 252 turns on, it generates a new clock pulse D1 and thereby initiates a new decoding procedure ( steps D1, etc., FIG. 3) for decoding the next code word, which by now has been properly positioned in the input register 200. This procedure is repeated until the last of the code words has been decoded.

FIG. 10 represents a sample decoding operation conducted under conditions that are more severe than those which ordinarily would be encountered in practice. The ( 1,8) code, FIG. 6, and (1,8) framing logic, FIG. 8, are used for this example. As indicated in the upper part of FIG. 10, three bit detection errors have occurred. The first error causes a six-bit code word to be incorrectly interpreted as two three-bit code words. However, synchronism is regained with the second framing decision. It is lost again due to two errors which cause two three-bit code words to be incorrectly interpreted as one six-bit code word. However, synchronism is reacquired with the third framing decision. The ingating and shift operations performed by the input register are tabularly represented in the lower part of FIG. 10. At interval TO the input register is assumed to be in an all-0 condition. The framing logic circuitry ( FIG. 8) interprets this as a nine-bit code word in order to bring the first nine bits of the actual code message into the input register ( interval T9). There then follows the sequence of framing decisions which break the bit stream up into code words of lengths 3, 3, 6, 6, etc.

FIG. 10 indicates that the decoding functions performed by the framing logic unit 202, FIG. 1B, and associative memory 20, FIG. 1A are suspended during the period while each new frame is being brought into proper registration with respect to the framing reference point ( FIG. 8) prior to decoding. This avoids the necessity of checking the bit pattern of the new frame repeatedly as it is being incrementally built up in the shift register 200, thereby saving considerable time. The framing decision is made only once per frame, at the start of the decoding operation and without interposing any delay therein.

FIG. 11 represents a decoding operation for an assumed example of coding in the (2,7) code system ( FIGS. 7 and 9). Two errors in bit detection cause a bit sequence which successively comprises a four-bit code, a six-bit code and an eight-bit code to be actually framed as an eight-bit code followed by a six-bit code that in turn is followed by a four-bit code. With the third framing decision, synchronism is regained.

The foregoing examples indicate the rapidity with which synchronism can be reacquired by the present system even under conditions which otherwise would tend to create unusually severe framing problems. This is a consequence of using run-length-limited codes in the unique variable-length format disclosed herein.

The selection of the locations at which the logical AND and OR tests will be made by the framing logic unit 202 among the bit positions of the input register 200, FIGS. 8 and 9, will depend upon the word-ending bit patterns employed in the code system that is being used. The placement of these test points can be generalized as follows, at least for the (1,8) and (2,7) codes which are being considered herein. Let Z be the maximum number of consecutive 0's and Y the minimum number of consecutive 0's in which a code word may terminate in the given code system. Let N be the smallest integer which, when divided by another integer ($\alpha$), will yield the ratio that the number of encoded bits bears to the number of original bits in the particular code system that is being used. Next, define groups of bit-storing positions within the input register 200 such that each group starts with the position whose number is $N+i+(i-1)(Z-Y)$ and ends with the position whose number is $Z$ plus said starting number, where "$i$" is a member of a set of integers including 1 and any higher integer having a value that defines a starting position whose number does not exceed W (the maximum length of any code word in the code system under consideration). Then, for each group of positions thus defined, establish a logical AND test, the inputs to which comprise the respective inversions of the bits stored in the $Y$ lowest-numbered positions of the respective group together with the logical OR of the remaining bits within that group.

Applying the rule thus stated to the framing logic unit 202 for the (1,8) code, FIGS. 8 and 6, it may be noted, first, that the maximum number $Z$ of terminal 0's in any encoded word is 3, and the minimum number $Y$ of terminal 0's is 1. In this code system the ratio $N/\alpha$ is 3/2; hence $N$=3. Now, letting $i$=1 in the expression $N+i+(i-1)(Z-Y)$, the starting position of the first group is seen to be position No. 4. The final position number of this group is 4+$Z$, or 7. The positions 4 through 7 of the input register 200, FIG. 8, constitute the first group of test positions. The lowermost $Y$ positions of this group (in this case position No. 4, since $Y$=1) will furnish inverted input to the AND circuit 214. The remaining positions (Nos. 5, 6 and 7) of this group furnish OR'ed inputs to the AND circuit 214. A satisfaction signal is generated on wire B if this AND test is satisfied by the presence of a 0 in position No. 4 and a "1" in at least one of the three positions 5, 6 and 7.

In similar fashion, by letting $i$=2 in the expression $N+i+(i-1)(Z-Y)$, the second group of test positions in the register 200, FIG. 8, is defined as the group starting with position No. 7 and ending in position No. 10. Position No. 7 is common to both groups, but in the second group this position furnishes an inverted bit signal to the AND circuit 210. Positions 8, 9 and 10 furnish OR'ed bit signals to AND circuit 210. Satisfaction of this AND test generates a satisfaction signal on wire A.

In the case of the (2,7) code, FIGS. 9 and 7, the various parameters are $N$=2, $Z$=3 and $Y$=2. There are three groups of test positions, Nos. 3–6, 5–8 and 7–10, respectively, the starting positions of which are defined by letting $i$ have the successive values 1, 2 and 3 in the expression $N+i(i-1)(Z-Y)$, and whose final positions are defined by adding $Z$ (or 3) to each starting position. The lowermost $Y$ (or 2) positions of each group individually furnish inverted bit signals to the respective AND circuit 228, 236 or 240, FIG. 9, while the OR'ed bit signals from the remaining positions of that group provide the remaining input to such AND circuit. Satisfaction signals are generated on the wires A, B and C when the respective AND tests (if any) are satisfied.

The manner in which these satisfaction signals are converted into framing decisions has been explained above and is apparent also from inspection of the framing decision tables shown in FIGS. 8 and 9. Similar framing logic tests may be devised for other run-length-limited code systems which conform to predetermined word-ending constraints in accordance with the principle of this invention.

STATE-DEPENDENT ENCODING AND DECODING

The (1,8) and (2,7) codes shown in FIGS. 6 and 7 are state-independent, meaning that any of the encoded words in either of these systems may be placed adjacent to any other code word in that same system without violating the $(d,k)$ run-length constraints. In other run-length-limiting coding systems which might be chosen for the practice of this invention, the decoding and/or encoding of any given word may have to depend upon the terminal state of the preceding code word, in order not to violate the chosen $(d,k)$ constraints. Code systems of this kind are discussed in the aforesaid article by P. A. Franaszek in the July 1970 issue of the IBM Journal of Research and Development.

Figure 13:
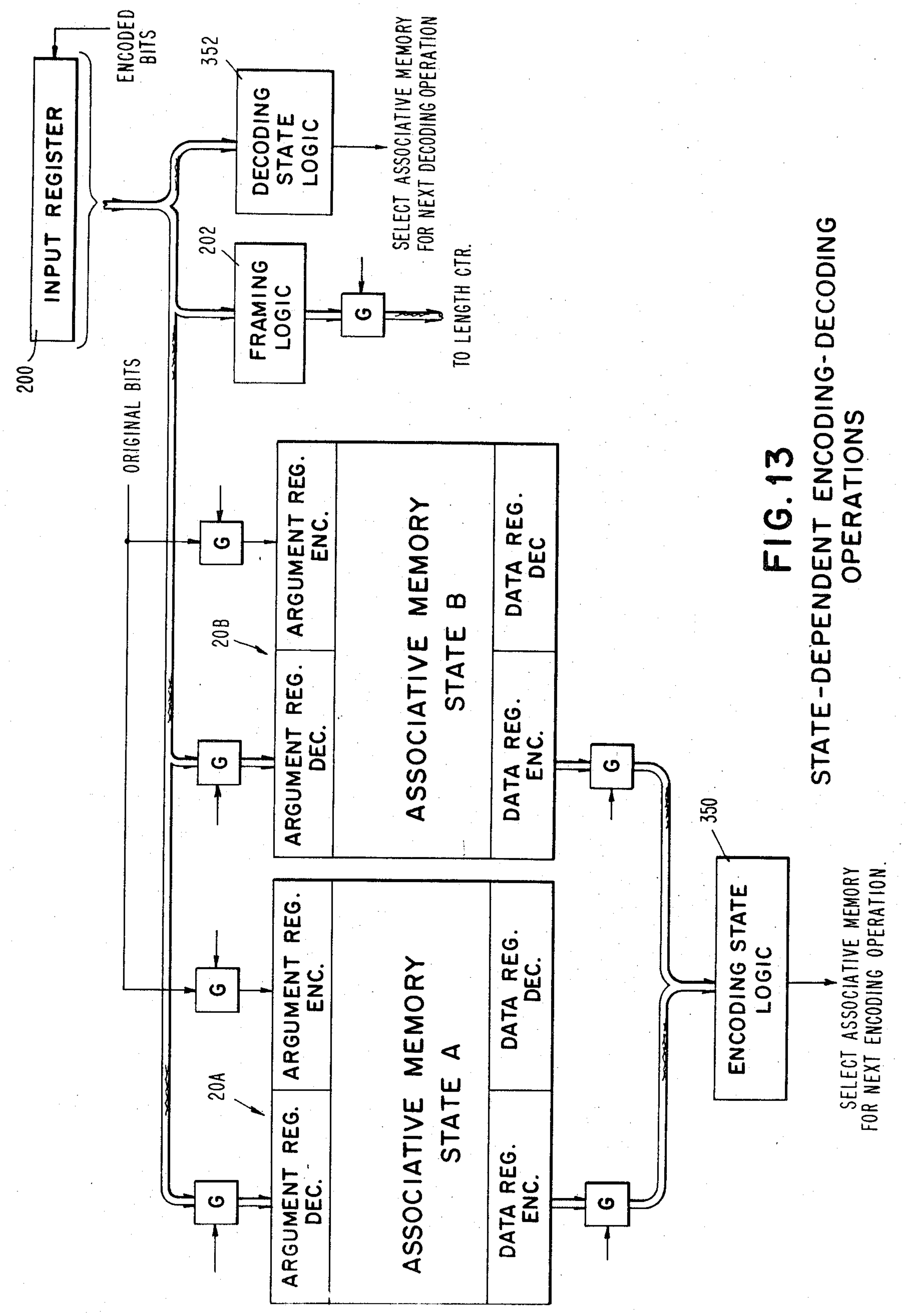
FIG. 13 is a fragmentary circuit diagram of a modified encoding-decoding system designed to handle state-dependent codes.

State-dependent encoding and decoding operations may be performed under the control of state-selecting logic circuitry 350 and 352, FIG. 13, the functioning of which is similar to that of the framing logic circuitry 202 in the case of the embodiment shown in FIGS. 1A–12. Where a state-dependent coding system is employed, separate encoding-decoding instrumentalities such as the associative memories 20A and 20B, FIG. 13, may be utilized. As each word is encoded, its terminal state is ascertained by the logic circuitry 350 to determine which of the associative memories such as 20A and 20B should be selected for the next encoding operation. If the decoding functions also are state-dependent, suitable logic circuitry 352 may be provided for selecting the associative memory such as 20A and 20B to be utilized in a decoding operation in accordance with the terminal state of the word previously decoded. State dependency during encoding does not necessarily mean that there will be state-dependency during decoding, if suitable redundancy exists.

What is claimed is:

1. A method of processing digital data in the form of variable-length code words which have been encoded from original bit strings of variable length under such constraints that each validly represented code word terminates in a selected one of a plurality of predefined word-ending bit sequences, the respective lengths of said code words having a fixed ratio to the numbers of bits in the respective bit strings from which such words have been encoded, said method comprising the steps of:

a. sequentially entering the bits of a bit stream containing a succession of said variable-length code words into a shift register or like device and causing such entered bits to be shifted through progressively higher-numbered positions within a given series of bit-storing positions in said device;

b. sensing those bits that currently occupy each of one of more groups of specially designated positions within said series of positions to ascertain whether a word-ending bit sequence currently is stored in any such group, the respective locations of said groups within said series being a function of the various code word lengths;

c. generating a satisfaction signal for any sensed group of positions that currently stores one of said word-ending bit sequences;

d. during each of certain preselected intervals between successive shifts of the entered bits as effected in step a, and in response to the performance of steps b and c, demarcating a selected set of said bit-storing positions as a frame containing the variable-length word to be decoded, the number of bit positions within said frame being determined in each instance by the presence or absence of satisfaction signals from the sensed groups of positions; and e. decoding the pattern of bits currently stored in said selected set of positions.

2. A data processing method as set forth in claim 1 wherein the number of shift intervals which elapse between each performance of steps d and e and the next succeeding performance of these steps is determined in each instance by the number of bit positions in the most recently demarcated frame.

3. A data processing method as set forth in claim 2 wherein the respective groups of bit-storing positions sensed during step b are so located in said device that each such group starts with a position whose relative number within said series of positions is $N+i+(i-1)(Z-Y)$ and ends with a position whose number is $Z$ plus said starting number, where:

$N$ is the smallest integer which, when divided by another integer, will yield said fixed ratio, $Z$ and $Y$, respectively, are the maximum and minimum numbers of consecutive bits each having a given binary value ( e.g., 0) in which a valid code word may terminate, and $i$ is a member of a set of integers including 1 and any higher integer having a value such as to define a starting position whose number does not exceed the maximum permissible code word length.

4. A data processing method as set forth in claim 3 wherein step b involves a logical AND test for each of the sensed groups of bits, the inputs to each such AND test including the inverse of each bit sensed in the $Y$ lowest-numbered positions of that group together with the logical OR of the remaining bits sensed within that group, and step c involves the generation of a satisfaction signal for each group in which said AND test is satisfied.

5. A data processing method as set forth in claim 1 wherein the particular set of positions selected during each occurrence of step d includes as its highest-numbered position the W'th position of said series, where "W" is the maximum permissible code word length.

6. A data processing method as set forth in claim 5 wherein the complete absence of satisfaction signals from the sensed group of positions demarcates a frame of length W.

7. A method of processing digital data which comprises the steps of:

a. encoding original bit strings of variable length into variable-length code words under such constraints that each code word must terminate in a selected one of a plurality of predefined word-ending bit sequences, the lengths of said code words having a fixed ratio to the numbers of bits in the respective bit strings from which such words have been encoded;

b. sequentially entering the bits of a bit stream containing a succession of said variable-length code words into a shift register or like device and causing such entered bits to be shifted through progressively higher-numbered positions within a given series of bit-storing positions in said device;

c. sensing those bits that currently occupy each of one or more groups of specially designated positions within said series of positions to ascertain whether a word-ending bit sequence currently is stored in any such group, the respective locations of said groups within said series being a function of the various code word lengths;

d. generating a satisfaction signal for any sensed group of positions that currently stores one of said word-ending bit sequences;

e. during each of certain preselected intervals between successive shifts of the entered bits, as effected in step b, and in response to the performance of steps c and d, demarcating a selected set of said bit-storing positions as a frame containing the variable-length word to be decoded, the number of bit positions within said frame being determined in each instance by the presence or absence of satisfaction signals from the sensed groups of positions; and f. decoding the pattern of bits currently stored in said selected set of positions.

8. A data processing method as set forth in claim 7 wherein the number of shift intervals which elapse between each performance of steps e and f and the next succeeding performance of these steps is determined in each instance by the number of bit positions in the most recently demarcated frame.

9. A data processing method as set forth in claim 7 wherein said encoding step a also imposes run-length-limited constraints upon each code word so that each 1 in said bit stream is separated from the nearest adjacent 1 by a number of 0's falling within a predetermined range of integers.

10. A data processing method as set forth in claim 9 wherein said range of integers extends from 1 to 8, inclusive.

11. A data processing method as set forth in claim 9 wherein said range of integers extends from 2 to 7, inclusive.

12. Apparatus for encoding original bit strings of variable length into variable-length code words whose respective lengths bear a constant ratio to the lengths of the respective bit strings from which they have been encoded, said apparatus comprising:

a. an associative memory containing rows of bit-storing cells, at least some of the cells in each row being of the three-state type, said memory being arranged in three sections, each section including corresponding portions of the various rows of cells, the first of said memory sections containing at least as many cells per row as the maximum number of bits that may exist in any of the variable-length code words and storing in each row thereof the bits of a respective one of said variable-length code words, the second of said memory sections containing at least as many cells per row as the maximum number of bits that may exist in any of the original bit strings from which said variable-length code words are encoded and storing in each row thereof the bits of a respective one of said original bit strings, those cells of said second memory section which do not store bits of such original bit strings being in their "don't care" states, the third of said memory sections storing in each row of cells therein a length indication denoting the number of bits in the original bit string which is stored in that same row;
b. an argument register of the shift type;
c. entry means operable for causing bits of an original bit stream containing a succession of said variable-length bit strings to be serially entered into said argument register and progressively shifted toward a predetermined registration position therein;
d. associating means operable for causing the significant bits of the bit pattern currently stored in said argument register to be matched with the significant bits of a corresponding bit string stored in said second memory section;
e. a data register of the shift type;
f. reading means operable for transferring to said data register the bit pattern which is stored within said first memory section in the same row of cells that contains the matching bit string;
g. output means operable for causing bits stored in said data register to be serially read out therefrom as elements of the encoded word which corresponds to the matching bit string; and
h. control means responsive to the length indication stored in said third memory section, within the row of cells that contains the matching bit string, for controlling the operations of said output means g and entry means c so that the number of bits serially read out of said data register e following each operation of said reading means f corresponds to said length indication times said constant ratio, and the number of bits serially entered into said argument register b prior to the next operation of said associating means d corresponds to said length indication.

13. An encoding apparatus as set forth in claim 12 wherein the cells of each of said rows contained within said first memory section are set so that the code word stored therein terminates in one of a plurality of distinctive word-ending bit sequences, those cells of said first memory section which do not store the bits of such code words being in their "don't care" states.

14. Encoding apparatus as set forth in claim 13 wherein each word stored in said first memory section is so constituted that each 1 bit read out of said data register e by said output means g is separated from the nearest adjacent 1 bit by a number of 0's falling within a constrained range of values.

15. Encoding apparatus as set forth in claim 14 wherein said range of values extends from 1 to 8, inclusive.

16. Encoding apparatus as set forth in claim 14 wherein said range of values extends from 2 to 7, inclusive.

17. Apparatus for converting a bit stream containing a succession of variable-length code words into a succession of decoded bit strings whose respective lengths bear a constant ratio to the respective code word lengths, said bit stream being so constituted that each valid code word representation therein terminates in one of a plurality of distinctive word-ending bit sequences, said apparatus comprising:

a. an input register of the shift type containing a succession of progressively numbered bit-storing positions and having a framing reference point at the end of a given series of such positions;
b. entry means operable at intervals for causing bits from said bit stream to be serially entered into said input register and shifted progressively through said series of positions toward said framing reference point;
c. framing decision means for sensing the presence or absence of any of said word-ending bit sequences at each of one or more groups of specially designated positions within said series of positions and for generating a current length representation according to the sensed pattern of such bit sequences, said length representation demarcating a particular set of input register positions preceding to said framing reference point in which the pattern of bits currently to be decoded is assumed to be stored and also denoting the length which the decoded bit string will have; and
d. means for decoding the pattern of bits currently stored in said set of positions.

18. Apparatus as set forth in claim 17, further comprising:

e. control means responsive to the current length representation generated by said framing decision means c for determining the number of bit entry and shift intervals which shall elapse during operation of said entry means b intermediate the current operation of said decoding means d and the next succeeding operation of said decoding means.

19. Apparatus as set forth in claim 17 wherein said decoding means d comprises the following elements:

d1. an associative memory containing rows of bit-storing cells, at least some of the cells in each row being of the three-state type, said memory including two sections each containing corresponding portions of the various rows of cells, said first memory section having at least as many cells per row as the maximum number of bits that may exist in a valid variable-length code word, those cells in said first memory section that do not store bits of such code words being in their "don't care" states, said second memory section having at least as many cells per row as the maximum number of bits that may exist in a decoded bit string;

d2. means enabling said memory to perform an association, using as an argument the bit pattern stored within said series of positions in said input register a, to find a matching code word in said first memory section;

d3. a data register of the shift type;

d4. reading means operable for entering into said data register the bit pattern stored within said second memory section in the same row of cells that contains the matching code word, or a predetermined dummy pattern if no matching code word is found; and d5. output means under the control of said control means e for serially reading out of said data register the number of bits denoted by said current length representation.

20. Apparatus as set forth in claim 19 wherein the respective groups of positions sensed by said framing decision means are so located in said input register a that each such group starts with a position whose relative number within said series of positions is $N+i+(i-1)(Z-Y)$ and ends with a position whose number is $Z$ plus said starting number, where:

$N$ is the smallest integer which, when divided by another integer, will yield said fixed ratio, $Z$ and $Y$, respectively, are the maximum and minimum numbers of consecutive bits each having a given binary value ( e.g., 0) in which a valid code word may terminate, and $i$ is a member of a set of integers including 1 and any higher integer having a value such as to define a starting position whose number does not exceed the maximum permissible code word length.

21. Apparatus as set forth in claim 20 wherein said framing decision means c includes, for each of said groups, a respective AND circuit the input to which consists of the inverse of the bit sensed in each of the Y lowest-numbered positions of that group together with the logical OR of the remaining bits sensed in that group, each of said AND circuits generating a satisfaction signal when its test is satisfied, and other logical circuitry for converting the pattern formed by the presence or absence of such satisfaction signals into said length representation.

22. Apparatus as set forth in claim 21 wherein said other logical circuitry is effective to generate a maximum length representation in response to the complete absence of satisfaction signals from said AND circuits.

* * * * *